US011663004B2

(12) United States Patent
Schwarz et al.

(10) Patent No.: US 11,663,004 B2
(45) Date of Patent: May 30, 2023

(54) VECTOR CONVERT HEXADECIMAL FLOATING POINT TO SCALED DECIMAL INSTRUCTION

(71) Applicant: INTERNATIONAL BUSINESS MACHINES CORPORATION, Armonk, NY (US)

(72) Inventors: Eric Mark Schwarz, Gardiner, NY (US); Kerstin Claudia Schelm, Stuttgart (DE); Petra Leber, Ehningen (DE); Silvia Melitta Mueller, Altdorf (DE); Reid Copeland, Richmond Hill (CA); Xin Guo, Toronto (CA); Cedric Lichtenau, Stuttgart (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 17/186,443

(22) Filed: Feb. 26, 2021

(65) Prior Publication Data

US 2022/0276867 A1 Sep. 1, 2022

(51) Int. Cl.

*G06F 9/30* (2018.01)
*G06F 7/483* (2006.01)
(Continued)

(52) U.S. Cl.

CPC .......... *G06F 9/30036* (2013.01); *G06F 7/483* (2013.01); *G06F 7/49947* (2013.01); *G06F 9/3001* (2013.01); *G06F 9/3555* (2013.01)

(58) Field of Classification Search

CPC .. G06F 9/3555; G06F 9/3001; G06F 9/30036; G06F 7/483; G06F 7/49947
See application file for complete search history.

(56) References Cited

U.S. PATENT DOCUMENTS 3,654,438 A 4/1972 Wyatt et al.
4,281,663 A 8/1981 Pringle
(Continued)

FOREIGN PATENT DOCUMENTS

CN 109614076 A 4/2019
CN 1096104076 A 4/2019
(Continued)

OTHER PUBLICATIONS

IBM, "z/Architecture—Principles of Operation," IBM Publication No. SA22-7832-12, Thirteenth Edition, Sep. 2019, pp. 1-2000.
(Continued)

*Primary Examiner* — Corey S Faherty
(74) *Attorney, Agent, or Firm* — Edward J. Wixted, III, Esq.; Blanche E. Schiller, Esq.; Heslin Rothenberg Farley & Mesiti P.C.

(57) ABSTRACT

An instruction to perform converting and scaling operations is provided. Execution of the instruction includes converting an input value in one format to provide a converted result in another format. The converted result is scaled to provide a scaled result. A result obtained from the scaled result is placed in a selected location. Further, an instruction to perform scaling and converting operations is provided. Execution of the instruction includes scaling an input value in one format to provide a scaled result and converting the scaled result from the one format to provide a converted result in another format. A result obtained from the converted result is placed in a selected location.

25 Claims, 19 Drawing Sheets

314

SCALE
OBTAIN VALUE OF A SELECTED PORTION OF THIRD OPERAND ~400
VALID? 410
NO
YES
DETERMINE SCALE FACTOR USING THE VALUE ~415
MULTIPLY SECOND OPERAND BY SCALE FACTOR TO OBTAIN SCALED RESULT ~420
END

(51) Int. Cl.
*G06F 7/499* (2006.01)
*G06F 9/355* (2018.01)

(56) References Cited

U.S. PATENT DOCUMENTS 4,347,618 A 8/1982 Kavouras
4,589,087 A 5/1986 Auslander
4,719,450 A 1/1988 Yamauchi
4,758,973 A 7/1988 Ooyama et al.
4,799,181 A 1/1989 Tague
5,191,335 A 3/1993 Leitherer
5,272,654 A 12/1993 Nix
5,655,133 A * 8/1997 Dupree ................. G06F 9/3885 712/205
5,687,106 A 11/1997 Schwarz
5,687,359 A 11/1997 Smith
5,889,980 A 3/1999 Smith
6,247,116 B1 * 6/2001 Abdallah ............ G06F 9/30036 712/E9.027
6,265,995 B1 7/2001 Sabejpal
6,591,361 B1 * 7/2003 Liao ...................... G06F 9/3001 708/517
6,671,796 B1 12/2003 Sudharsanan
7,707,233 B2 4/2010 Cornea-Hasegan
9,292,256 B2 3/2016 Lundvall et al.
9,778,908 B2 10/2017 Elmer
9,778,909 B2 10/2017 Samudrala
10,180,819 B2 1/2019 Brooks et al.
10,235,137 B2 3/2019 Bradbury et al.
10,782,932 B2 10/2020 Cowlishaw et al.
11,360,769 B1 6/2022 Schwarz et al.
2003/0046338 A1 3/2003 Runkis
2007/0022152 A1 1/2007 Gerwig
2009/0094441 A1 * 4/2009 Hack ................... G06F 9/30025 712/222
2011/0145308 A1 * 6/2011 Duale ..................... G06F 7/483 708/204
2014/0188962 A1 * 7/2014 Hack ................... G06F 9/30025 708/204
2016/0092165 A1 3/2016 Bradbury et al.
2018/0165093 A1 6/2018 Brooks
2020/0348908 A1 11/2020 Schelm

FOREIGN PATENT DOCUMENTS

JP H01237822 A 3/1988
JP H01217622 A 8/1989
WO WO2014183195 A1 11/2014

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

Schwarz, Eric Mark et al., "Vector Convert Hexadecimal Floating Point to Scaled Decimal Instruction," U.S. Appl. No. 17/186,302, filed Feb. 26, 2021, pp. 1-72.

List of IBM Patents or Patent Applications Treated As Related, Feb. 26, 2021, 2 pages.

Slishman, Gordon, "Fast and Perfectly Rounding Decimal/Hexidecimal Conversions," IBM Research Report RC 15683, IBM T.J. Watson Research Center, Apr. 1990, (11 pages).

Notification of Transmittal of the International Search Report and the Written Opinion of the International Searching Authority, PCT/EP2022/054052, dated Jun. 20, 2022, pp. 1-10.

Notification of Transmittal of the International Search Report and the Written Opinion of the International Searching Authority, PCT/EP2022/054049, dated Jun. 21, 2022, pp. 1-10.

Anonymous, "Faster Decimal Division," IBM Technical Disclosure Bulletin, Jan. 1, 1989, pp. 204-205.

* cited by examiner

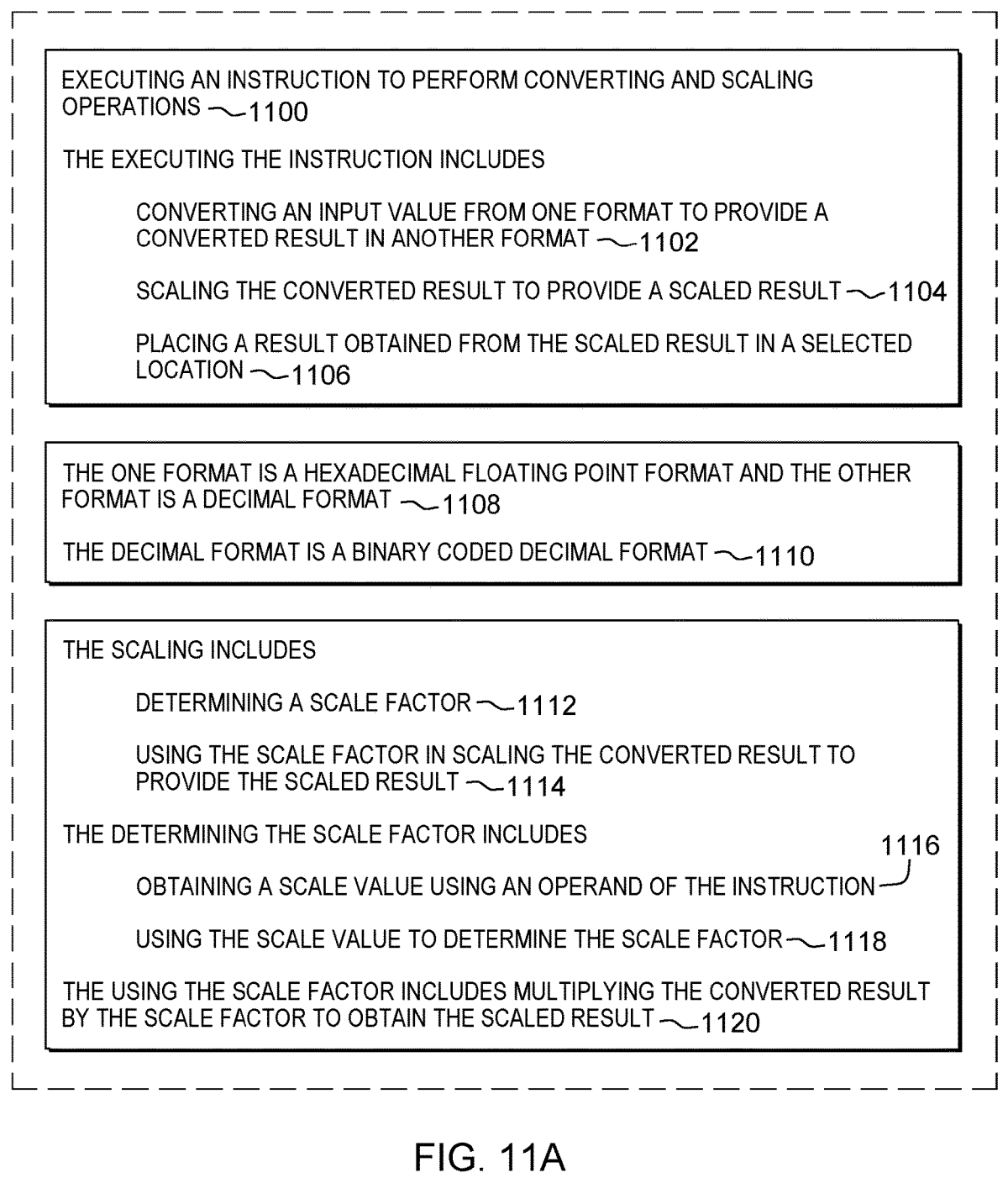

EXECUTING AN INSTRUCTION TO PERFORM CONVERTING AND SCALING OPERATIONS 1100

THE EXECUTING THE INSTRUCTION INCLUDES

CONVERTING AN INPUT VALUE FROM ONE FORMAT TO PROVIDE A CONVERTED RESULT IN ANOTHER FORMAT 1102

SCALING THE CONVERTED RESULT TO PROVIDE A SCALED RESULT 1104

PLACING A RESULT OBTAINED FROM THE SCALED RESULT IN A SELECTED LOCATION 1106

THE ONE FORMAT IS A HEXADECIMAL FLOATING POINT FORMAT AND THE OTHER FORMAT IS A DECIMAL FORMAT 1108

THE DECIMAL FORMAT IS A BINARY CODED DECIMAL FORMAT 1110

THE SCALING INCLUDES

DETERMINING A SCALE FACTOR 1112

USING THE SCALE FACTOR IN SCALING THE CONVERTED RESULT TO PROVIDE THE SCALED RESULT 1114

THE DETERMINING THE SCALE FACTOR INCLUDES

OBTAINING A SCALE VALUE USING AN OPERAND OF THE INSTRUCTION 1116

USING THE SCALE VALUE TO DETERMINE THE SCALE FACTOR 1118

THE USING THE SCALE FACTOR INCLUDES MULTIPLYING THE CONVERTED RESULT BY THE SCALE FACTOR TO OBTAIN THE SCALED RESULT 1120

FIG. 11A

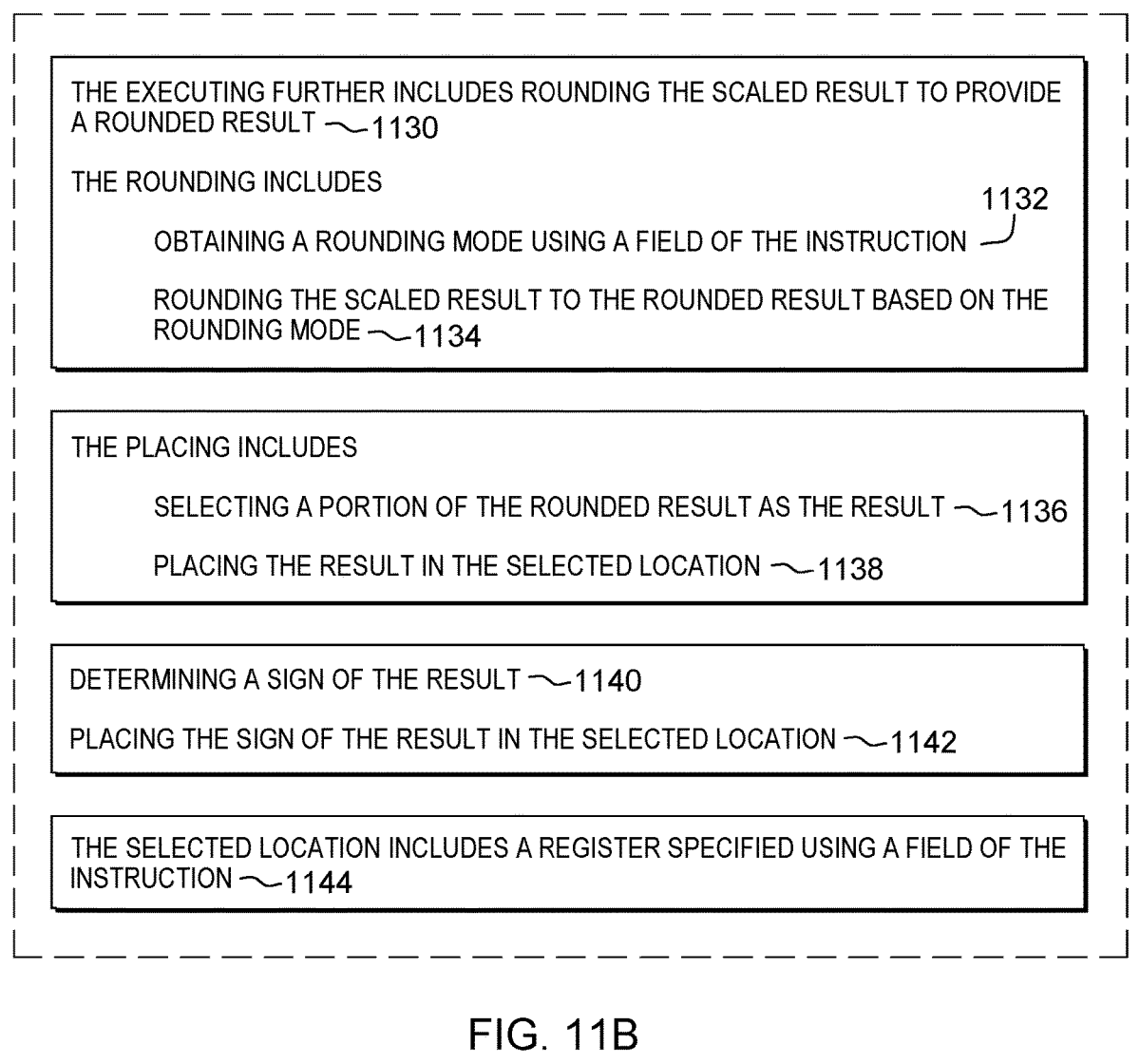

THE EXECUTING FURTHER INCLUDES ROUNDING THE SCALED RESULT TO PROVIDE A ROUNDED RESULT 1130

THE ROUNDING INCLUDES

OBTAINING A ROUNDING MODE USING A FIELD OF THE INSTRUCTION 1132

ROUNDING THE SCALED RESULT TO THE ROUNDED RESULT BASED ON THE ROUNDING MODE 1134

THE PLACING INCLUDES

SELECTING A PORTION OF THE ROUNDED RESULT AS THE RESULT 1136

PLACING THE RESULT IN THE SELECTED LOCATION 1138

DETERMINING A SIGN OF THE RESULT 1140

PLACING THE SIGN OF THE RESULT IN THE SELECTED LOCATION 1142

THE SELECTED LOCATION INCLUDES A REGISTER SPECIFIED USING A FIELD OF THE INSTRUCTION 1144

FIG. 11B

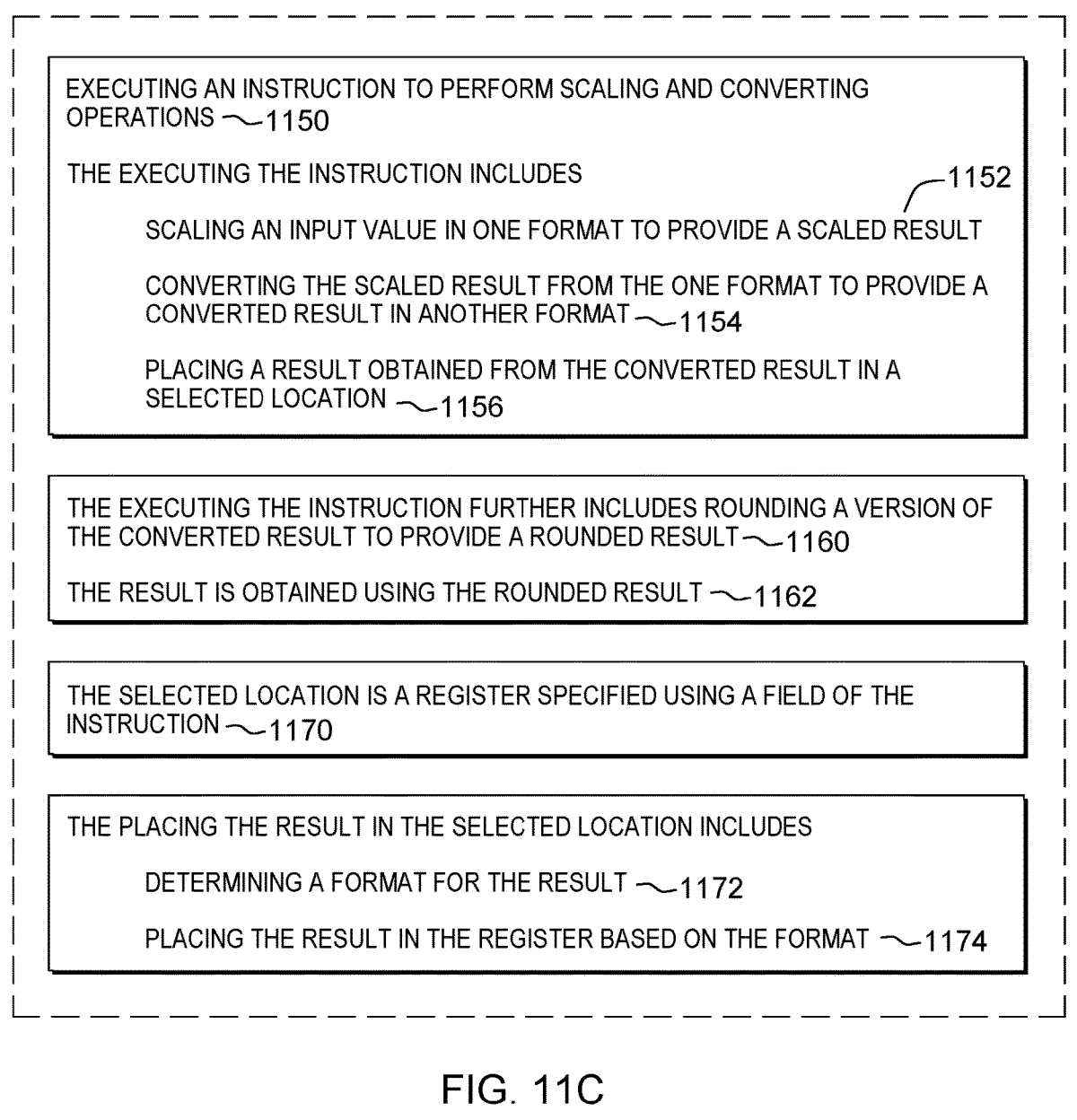

EXECUTING AN INSTRUCTION TO PERFORM SCALING AND CONVERTING OPERATIONS 1150

THE EXECUTING THE INSTRUCTION INCLUDES

SCALING AN INPUT VALUE IN ONE FORMAT TO PROVIDE A SCALED RESULT 1152

CONVERTING THE SCALED RESULT FROM THE ONE FORMAT TO PROVIDE A CONVERTED RESULT IN ANOTHER FORMAT 1154

PLACING A RESULT OBTAINED FROM THE CONVERTED RESULT IN A SELECTED LOCATION 1156

THE EXECUTING THE INSTRUCTION FURTHER INCLUDES ROUNDING A VERSION OF THE CONVERTED RESULT TO PROVIDE A ROUNDED RESULT 1160

THE RESULT IS OBTAINED USING THE ROUNDED RESULT 1162

THE SELECTED LOCATION IS A REGISTER SPECIFIED USING A FIELD OF THE INSTRUCTION 1170

THE PLACING THE RESULT IN THE SELECTED LOCATION INCLUDES

DETERMINING A FORMAT FOR THE RESULT 1172

PLACING THE RESULT IN THE REGISTER BASED ON THE FORMAT 1174

FIG. 11C

VECTOR CONVERT HEXADECIMAL FLOATING POINT TO SCALED DECIMAL INSTRUCTION

BACKGROUND

One or more aspects relate, in general, to facilitating processing within a computing environment, and in particular, to improving such processing.

Applications executing within a computing environment provide many operations used by numerous types of technologies, including but not limited to, engineering, manufacturing, medical technologies, automotive technologies, computer processing, etc. These applications, written in a programming language, such as COBOL, often perform complex calculations in performing the operations. The calculations include, for instance, power and/or exponentiation functions, which often require conversion of data from one format (e.g., binary coded decimal) to another format (e.g., hexadecimal floating point), and vice versa.

In order for an application to perform the conversion from one format to another format, various steps are executed. For instance, to convert from binary coded decimal to hexadecimal floating point, an application includes steps to convert a binary coded decimal number to an integer number, then the integer number is converted to hexadecimal floating point. Further, to convert back to binary coded decimal, the hexadecimal floating point number is converted to an integer number, and then the integer number is converted to binary coded decimal. Moreover, each of those steps may include sub-steps. This is time-consuming, impacting performance of the computing environment, and affecting availability of computer resources.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes executing an instruction to perform converting and scaling operations. The executing the instruction includes converting an input value from one format to provide a converted result in another format, scaling the converted result into a scaled result, and placing a result obtained from the scaled result in a selected location.

By using a single instruction to perform the converting and scaling operations, performance is improved, and utilization of resources is reduced. By using a single architected instruction to perform the converting and scaling operations, certain tasks may be performed, such as the converting and scaling operations, much more efficiently than using a software paradigm. The converting and scaling operations are performed much faster, reducing execution time, and improving processor and/or overall system performance.

In one example, the one format is a hexadecimal floating point format, and the other format is a decimal format. As an example, the decimal format is a binary coded decimal format.

In one example, the scaling includes determining a scale factor and using the scale factor in scaling the converted result to provide the scaled result. The determining the scale factor includes, for instance, obtaining a scale value using an operand of the instruction and using the scale value to determine the scale factor. The using the scale factor includes multiplying the converted result by the scale factor to obtain the scaled result.

The scaling isolates, for instance, certain digits of a number to indicate a selected location in the number to truncate or round, as examples.

In one example, the scaled result is rounded to provide a rounded result. The rounding includes obtaining a rounding mode using a field of the instruction and rounding the scaled result to the rounded result based on the rounding mode.

In one example, the placing includes selecting a portion of the rounded result as the result and placing the result in the selected location.

In one example, a sign of the result is determined, and the sign of the result is placed in the selected location. The selected location is, for instance, a register specified using a field of the instruction.

In another aspect, a computer program product for facilitating processing within a computing environment is provided. The computer program product includes one or more computer readable storage media and program instructions collectively stored on the one or more computer readable storage media to perform a method. The method includes executing an instruction to perform scaling and converting operations. The executing the instruction includes scaling an input value in one format to provide a scaled result, converting the scaled result from the one format to provide a converted result in another format, and placing a result obtained from the converted result in a selected location.

By using a single instruction to perform the scaling and converting operations, performance is improved, and utilization of resources is reduced. By using a single architected instruction to perform the scaling and converting operations, certain tasks may be performed, such as the scaling and converting operations, much more efficiently than using a software paradigm. The scaling and converting operations are performed much faster, reducing execution time, and improving processor and/or overall system performance.

In one example, the executing the instruction further includes rounding a version of the converted result to provide a rounded result, and wherein the result is obtained using the rounded result.

By using a single instruction to perform the scaling, converting and rounding operations, performance is improved, and utilization of resources is reduced. By using a single architected instruction to perform the scaling, converting and rounding operations, certain tasks may be performed, such as the scaling, converting and rounding operations, much more efficiently than using a software paradigm. The scaling, converting and rounding operations are performed much faster, reducing execution time, and improving processor and/or overall system performance.

As an example, the selected location is a register specified using a field of the instruction, and the placing the result in the selected location includes determining a format for the result and placing the result in the register based on the format.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 11A-11B depict one example of facilitating processing within a computing environment, in accordance with one or more aspects of the present invention;

FIG. 11C depicts another example of facilitating processing within a computing environment, in accordance with one or more aspects of the present invention;

DETAILED DESCRIPTION

Figure 1A:
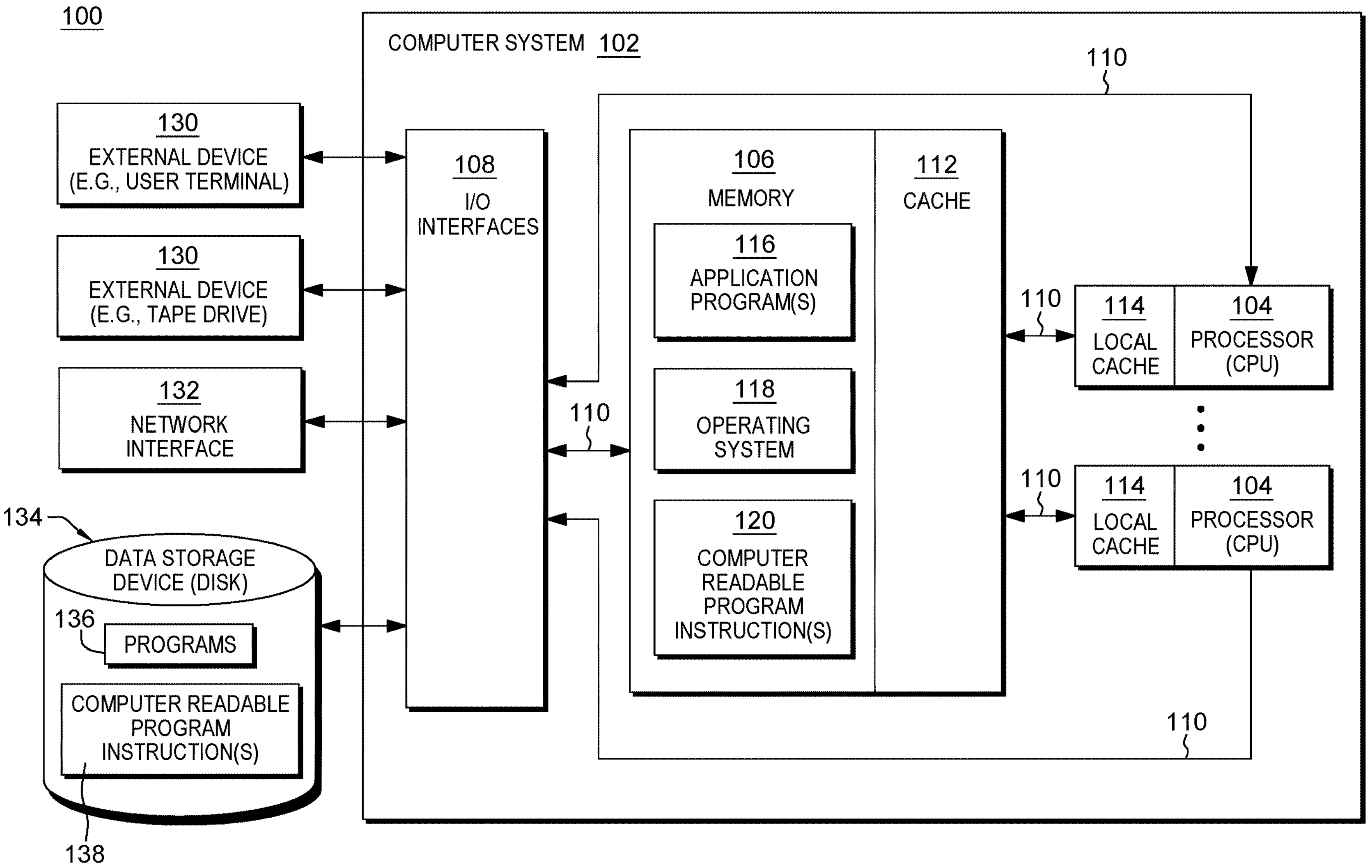
FIG. 1A depicts one example of a computing environment to incorporate and use one or more aspects of the present invention.

In accordance with an aspect of the present invention, a capability is provided to facilitate processing within a computing environment. As one example, a single instruction (e.g., a single architected hardware machine instruction at the hardware/software interface) is provided to perform scale and convert operations. The instruction, referred to herein as a Decimal Scale and Convert to Hexadecimal Floating Point instruction, is part of a general-purpose processor instruction set architecture (ISA), which is dispatched by a program on a processor, such as a general-purpose processor. (In another example, the instruction may be part of a special-purpose processor, such as a co-processor configured for certain functions.)

As part of execution of the single instruction (e.g., the Decimal Scale and Convert to Hexadecimal Floating Point instruction), various operations are performed including scaling the input data using a scale factor to provide scaled data and converting the scaled data from one format (e.g., binary coded decimal) to another format (e.g., hexadecimal floating point). Each of these operations is performed as part of executing the single instruction, improving system performance, and reducing use of system resources.

In accordance with another aspect of the present invention, a single instruction (e.g., a single architected hardware machine instruction at the hardware/software interface) is provided to perform convert and then scale operations. The instruction, referred to herein as a Vector Convert Hexadecimal Floating Point to Scaled Decimal instruction, is part of a general-purpose processor instruction set architecture (ISA), which is dispatched by a program on a processor, such as a general-purpose processor. (In another example, the instruction may be part of a special-purpose processor, such as a co-processor configured for certain functions.)

As part of execution of the single instruction (e.g., the Vector Convert Hexadecimal Floating Point to Scaled Decimal instruction), various operations are performed including converting the input data from one format (e.g., hexadecimal floating point) to another format (e.g., binary coded decimal), and scaling the converted data. Each of these operations is performed as part of executing the single instruction, improving system performance, and reducing use of system resources.

In one example, as indicated, the conversion is from binary coded decimal to hexadecimal floating point or from hexadecimal floating point to binary coded decimal. Binary coded decimal is a binary encoding of a decimal number, in which each decimal digit is represented by a fixed number of bits (e.g., 4 or 8 bits). Hexadecimal floating point is a format for encoding floating point numbers. In one example, a hexadecimal floating point number includes a sign bit, a characteristic (e.g., 7 bits) and a fraction (e.g., 6, 14 or 28 digits). The characteristic represents a signed exponent and is obtained by adding, e.g., 64 to the exponent value. The range of the characteristic is 0 to 127, which corresponds to an exponent range of, e.g., −64 to +63. The magnitude of a hexadecimal floating point number is the product of its fraction and the number 16 raised to the power of the exponent that is represented by its characteristic. The number is positive or negative depending on whether the sign bit is, e.g., zero or one, respectively.

A hexadecimal floating point number may be represented in a number of different formats, including a short format (e.g., 32-bit), a long format (e.g., 64-bit) and an extended format (e.g., 128-bit). In each format, the first bit (e.g., the first leftmost bit, bit 0) is the sign bit; the next selected number of bits (e.g., seven bits) are the characteristic, and in the short and long formats, the remaining bits are the fraction, which include, e.g., six or fourteen hexadecimal digits, respectively. In the extended format, the fraction is, e.g., a 28-digit fraction, and the extended hexadecimal floating point number consists of two long format numbers that are called the high-order and the low-order parts. The high-order part is any long hexadecimal floating point number. The fraction of the high-order part contains, e.g., the leftmost 14 hexadecimal digits of the 28-digit fraction, and the fraction of the low-order part contains, e.g., the rightmost 14 hexadecimal digits of the 28-digit fraction. The characteristic and sign of the high-order part are the characteristic and sign of the extended hexadecimal floating point number, and the sign and characteristic of the low-order part of an extended operand are ignored.

One embodiment of a computing environment to incorporate and use one or more aspects of the present invention is described with reference to FIG. 1A. As an example, the computing environment is based on the z/Architecture® hardware architecture, offered by International Business Machines Corporation, Armonk, N.Y. One embodiment of the z/Architecture hardware architecture is described in a publication entitled, "z/Architecture Principles of Operation," IBM Publication No. SA22-7832-12, Thirteenth Edition, September 2019, which is hereby incorporated herein by reference in its entirety. The z/Architecture hardware architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Referring to FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of processors 104. Further, memory 106 may include one or more programs or applications 116 and at least one operating system 118. An example operating system includes a z/OS® operating system, offered by International Business Machines Corporation, Armonk, N.Y. z/OS is a trademark or registered trademark of International Business Machines Corporation in at least one jurisdiction. Other operating systems offered by International Business Machines Corporation and/or other entities may also be used. Memory 106 may also include one or more computer readable program instructions 120, which may be configured to carry out functions of embodiments of aspects of the invention.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special-purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
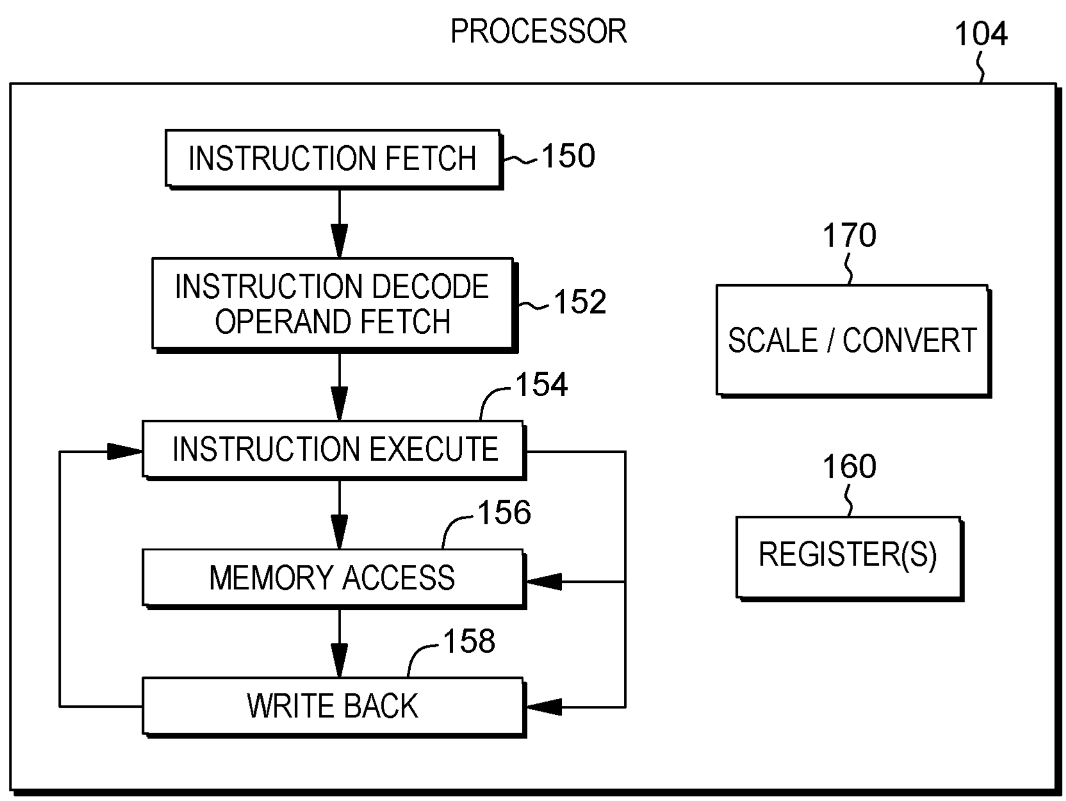
FIG. 1B depicts further details of a processor of FIG. 1A, in accordance with one or more aspects of the present invention.

In one example, a processor (e.g., processor 104) includes a plurality of functional components used to execute instructions. As depicted in FIG. 1B, these functional components include, for instance, an instruction fetch component 150 to fetch instructions to be executed; an instruction decode unit 152 to decode the fetched instructions and to obtain operands of the decoded instructions; one or more instruction execute components 154 to execute the decoded instructions; a memory access component 156 to access memory for instruction execution, if necessary; and a write back component 158 to provide the results of the executed instructions. One or more of the components may access and/or use one or more registers 160 in instruction processing. Further, one or more of the components may, in accordance with one or more aspects of the present invention, include at least a portion of or have access to one or more other components used in performing scaling and/or converting operations of, e.g., a Decimal Scale and Convert to Hexadecimal Floating Point instruction and/or a Vector Convert Hexadecimal Floating Point to Scaled Decimal instruction (or other processing that may use one or more aspects of the present invention), as described herein. The one or more other components include, for instance, a scale/convert component (or one or more other components) 170.

In accordance with an aspect of the present invention, an instruction, referred to herein as a Decimal Scale and Convert to Hexadecimal Floating Point instruction, is provided to perform, as part of executing the one instruction, at least, scaling and converting operations to convert a number from one format (e.g., decimal, such as signed packed decimal) to another format (e.g., hexadecimal floating point).

One embodiment of a Decimal Scale and Convert to Hexadecimal Floating Point instruction used to perform scale and convert operations is described with reference to FIG. 2. The instruction is executed, in one example, using a general-purpose processor (e.g., processor 104). In the description herein, specific locations, specific fields and/or specific sizes of the fields are indicated (e.g., specific bytes and/or bits). However, other locations, fields and/or sizes may be provided. Further, although the setting of a bit to a particular value, e.g., one or zero, may be specified, this is only an example. The bit may be set to a different value, such as the opposite value or to another value, in other examples. Many variations are possible.

In one example, the Decimal Scale and Convert to Hexadecimal Floating Point instruction has a VRR-b format that denotes a vector register and register operation with an extended operation code (opcode). The Decimal Scale and Convert to Hexadecimal Floating Point instruction is, for instance, part of a vector facility, which provides, for instance, fixed sized vectors ranging from one to sixteen elements. Each vector includes data which is operated on by vector instructions defined in the facility. In one embodiment, if a vector is made up of multiple elements, then each element is processed in parallel with the other elements. Instruction completion does not occur, in one example, until processing of all the elements is complete. In other embodiments, the elements are processed partially in parallel and/or sequentially.

In one embodiment, there are 32 vector registers and other types of registers can map to a quadrant of the vector registers. For instance, a register file, which is an array of processor registers in a central processing unit (e.g., processor 104), may include 32 vector registers and each register is 128 bits in length. Sixteen floating point registers, which are 64 bits in length, can overlay the vector registers. Thus, as an example, when floating point register 2 is modified, then vector register 2 is also modified. Other mappings for other types of registers are also possible.

Vector data appears in storage, for instance, in the same left-to-right sequence as other data formats. Bits of a data format that are numbered 0-7 constitute the byte in the leftmost (lowest-numbered) byte location in storage, bits 8-15 form the byte in the next sequential location, and so on. In a further example, the vector data may appear in storage in another sequence, such as right-to-left.

Figure 2:
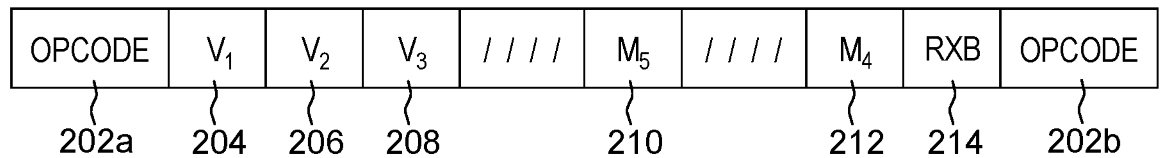
FIG. 2 depicts one example of a format of a Decimal Scale and Convert to Hexadecimal Floating Point instruction, in accordance with one or more aspects of the present invention.

As shown in FIG. 2, in one example, a Decimal Scale and Convert to Hexadecimal Floating Point instruction 200 has a plurality of fields, and a field may have a subscript number associated therewith. The subscript number associated with a field of the instruction denotes the operand to which the field applies. For instance, the subscript number 1 associated with vector register $V_1$ denotes that the register specified using $V_1$ includes the first operand, and so forth. A register operand is one register in length, which is, for instance, 128 bits.

In one embodiment, Decimal Scale and Convert to Hexadecimal Floating Point instruction 200 includes operation code (opcode) fields 202*a*, 202*b* (e.g., bits 0-7 and 40-47) indicating scale and convert operations, in which the input data is, e.g., a decimal number (e.g., a signed packed decimal number, such as a binary coded decimal number having, e.g., 31 digits and a sign) and the output is, e.g., a hexadecimal floating point value; a first vector register ($V_1$) field 204 (e.g., bits 8-11) used to designate a first vector register; a second vector register ($V_2$) field 206 (e.g., bits 12-15) used to designate a second vector register; a third vector register ($V_3$) field 208 (e.g., bits 16-19) used to designate a third vector register; a first mask ($M_5$) field 210 (e.g., bits 24-27); a second mask ($M_4$) field 212 (e.g., bits 32-35); and a register extension bit (RXB) field 214 (e.g., bits 36-39), each of which is described below. In one embodiment, the fields are separate and independent from one another; however, in other embodiments, more than one field may be combined. Further information regarding these fields is described below.

In one embodiment, vector register ($V_1$) field 204 is used to indicate a vector register that is to store the first operand. The first operand is a result obtained from scaling and converting a decimal value to a hexadecimal floating point value. The second operand is contained in the vector register specified using vector register ($V_2$) field 206 and is, for instance, a signed packed decimal number (e.g., a binary coded decimal having, e.g., 31 digits plus a sign) that is scaled using an unsigned integer included in the third operand, which is contained in the vector register specified using vector register ($V_3$) field 208.

In one example, each of vector register fields 204, 206, 208 is used with RXB field 214 to designate the vector register. For instance, RXB field 214 includes the most significant bit for a vector register designated operand. Bits for register designations not specified by the instruction are to be reserved and set to zero. The most significant bit is concatenated, for instance, to the left of the four-bit register designation of the vector register field to create a five-bit vector register designation.

In one example, the RXB field includes four bits (e.g., bits 0-3), and the bits are defined, as follows:

0—Most significant bit for the first vector register designation (e.g., in bits 8-11) of the instruction.

1—Most significant bit for the second vector register designation (e.g., in bits 12-15) of the instruction, if any.

2—Most significant bit for the third vector register designation (e.g., in bits 16-19) of the instruction, if any.

3—Most significant bit for the fourth vector register designation (e.g., in bits 32-35) of the instruction, if any.

Each bit is set to zero or one by, for instance, the assembler depending on the register number. For instance, for registers 0-15, the bit is set to 0; for registers 16-31, the bit is set to 1, etc.

In one embodiment, each RXB bit is an extension bit for a particular location in an instruction that includes one or more vector registers. For instance, bit 0 of RXB is an extension bit for location 8-11, which is assigned to, e.g., $V_1$, and so forth. In particular, for vector registers, the register containing the operand is specified using, for instance, a four-bit field of the register field with the addition of its corresponding register extension bit (RXB) as the most significant bit. For instance, if the four bit field is 0110 and the extension bit is 0, then the five bit field 00110 indicates register number 6. In a further embodiment, the RXB field includes additional bits, and more than one bit is used as an extension for each vector or location.

In one example, the size of the first operand is selected by a floating point format control specified, for instance, in $M_4$ field 212. The $M_4$ field specifies the hexadecimal floating point format for operand one. If a reserved value of the $M_4$ field is specified, a specification exception is recognized. Example values for the $M_4$ field include, for instance:

| $M_4$ | Floating Point Format |
|---|---|
| 0-1 | Reserved |
| 2 | Short Format |
| 3 | Long Format |
| 4 | Extended Format |
| 5-15 | Reserved |

Although particular values and formats are provided as examples, additional, fewer and/or other values and/or formats may be used.

In one example, a rounding mode is specified using $M_5$ field 210. The scaled and converted result is rounded by the rounding technique, as specified by a rounding mode control in the $M_5$ field, which is, for instance, in bit 3 of the four-bit $M_5$ field. When the control (e.g., bit) is, e.g., zero, a normalized result obtained from the converted result is truncated to form the result. When the control is, e.g., one, the normalized result is rounded to nearest with ties away from zero. A normalized result includes, for instance, the 29, 15 or 7 most significant hexadecimal digits of the scaled and converted result for extended, long and short format, respectively, which includes, in one example, one guard digit on the right. (The guard digit may increase the precision of the final result because it participates in certain operations including, for instance, addition, subtraction, comparison, and the left shift that occurs during normalization.) A one is added to the leftmost bit of the guard digit of the normalized result, any carry is propagated to the left, and the guard digit is dropped to produce the result fraction.

In execution of one embodiment of the Decimal Scale and Convert to Hexadecimal Floating Point instruction, the second operand is scaled using an unsigned integer in a selected location (e.g., byte element seven) of the third operand and converted to a hexadecimal floating point number. The second operand is multiplied by a scale factor which is equal to, for instance, 10 to the power of byte element seven of the third operand. The scaled result is converted to, e.g., a hexadecimal floating point value. The size of the first operand is selected by the floating point format control in the $M_4$ field. The scaled and converted result (e.g., a normalized converted result) is rounded using the rounding technique specified in the $M_5$ field. The result obtained from rounding the normalized converted result, based on the rounding mode control specified in $M_5$, is placed in the entire vector register specified by the first operand, for all formats, placing the result in, e.g., the zero-indexed element in the vector and placing, e.g., zeros in any other elements.

The sign of the result is equal to the sign code of the second operand except when the second operand is zero, and then the result is forced to be a positive true zero. A true zero is a hexadecimal floating point number with a zero characteristic and a zero fraction.

In one example, the digits and sign of the second operand are checked for validity. If the validity check fails, a general operand data exception is recognized.

Further details of one embodiment of processing based on execution of a Decimal Scale and Convert to Hexadecimal Floating Point instruction, in accordance with one or more aspects of the present invention, are described with reference to FIGS. 3-6. In one example, a processor, such as a general processor 104, is used to execute the instruction. As an example, hardware of the processor is used to execute the instruction. The hardware may be within the processor or coupled thereto for purposes of receiving the instruction from the processor, which, e.g., obtains, decodes and sets-up the instruction to execute on the hardware. Other variations are possible.

Figure 3:
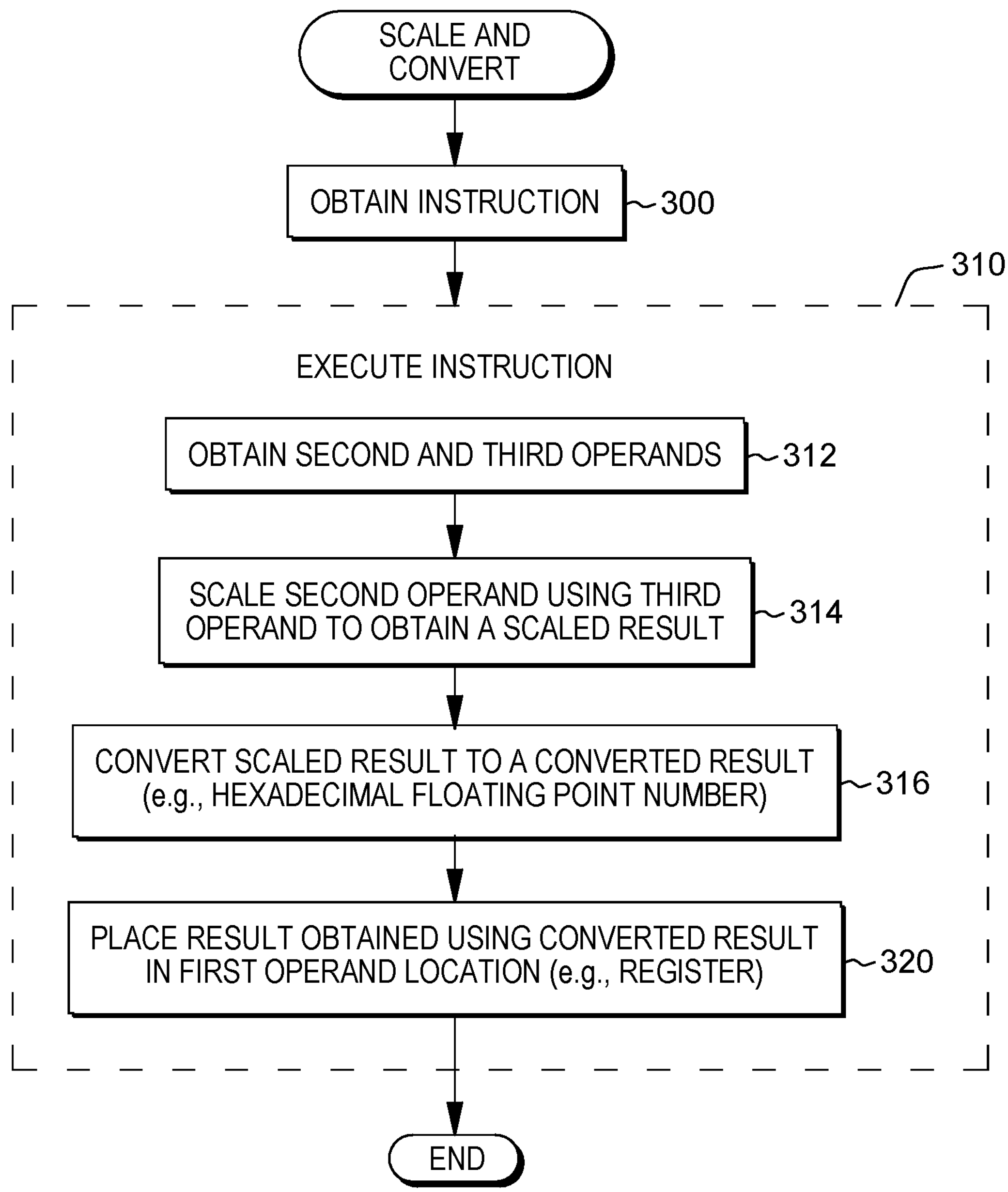
FIG. 3 depicts one example of processing associated with execution of a Decimal Scale and Convert to Hexadecimal Floating Point instruction, in accordance with one or more aspects of the present invention.

Referring to FIG. 3, initially, an instruction, such as a Decimal Scale and Convert to Hexadecimal Floating Point instruction, is obtained (e.g., fetched, received, provided, etc.) (300), and executed (310). The executing includes, for instance, obtaining the second and third operands of the instruction (312). The second operand is, for instance, a signed packed decimal number obtained from a location (e.g., a vector register) specified by the instruction (e.g., using $V_2$ field 206), and the third operand includes, for instance, an unsigned integer obtained from a location (e.g., a vector register) specified by the instruction (e.g., using $V_3$ field 208). In one example, the unsigned integer is located in byte element seven of the third operand.

The second operand (e.g., the signed packed decimal number obtained using $V_2$) is scaled using the unsigned integer in, e.g., byte element seven of the third operand (obtained using, e.g., $V_3$) to obtain a scaled result (314).

The scaled result, which is in one format (e.g., decimal, such as signed packed decimal—a.k.a., binary coded decimal), is converted to a converted result in another format (316). For instance, the scaled decimal number is converted to a hexadecimal floating point number. A result obtained from the converted result, as described herein, is placed in the first operand location (e.g., a register specified using $V_1$) (320). Further details regarding the scaling, converting and placing are described with reference to FIGS. 4-6.

Figure 4:
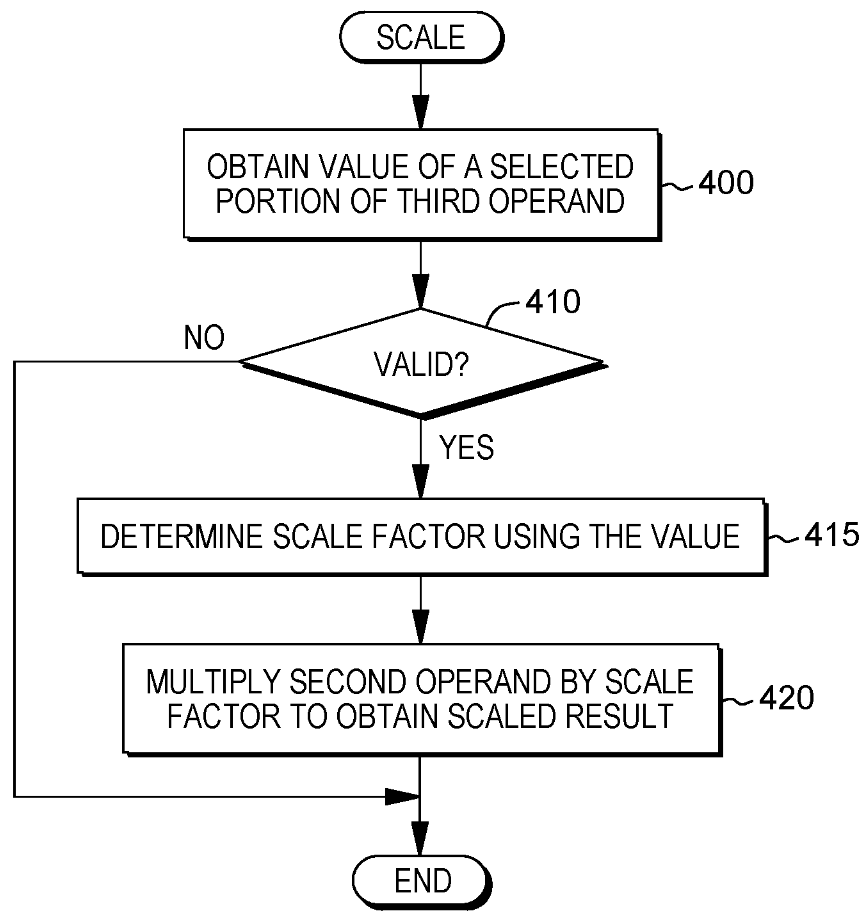
FIG. 4 depicts one example of processing associated with a scaling operation of the Decimal Scale and Convert to Hexadecimal Floating Point instruction, in accordance with one or more aspects of the present invention.

Referring initially to FIG. 4, one embodiment of performing the scaling of the second operand (314 of FIG. 3) is described. In one example, a value, referred to as a scale value, of a selected portion (e.g., byte element seven) of the third operand (stored in a vector register designated using $V_3$) is obtained (400). A determination is made as to whether the value is valid (410). For instance, a determination is made as to whether the value has a predetermined relationship with a preselected value, e.g., is the value less than a preselected value, such as 8, as an example? If the value is invalid, the processing ends, e.g., with an error. However, if the value is valid, processing continues with using the value to determine a scale factor. For instance, the scale factor is equal to 10 to the power of the value (415). The second operand is multiplied by the scale factor to obtain a scaled result (420). In one example, since the second operand is a signed packed decimal number, the scaling by a power of 10 is equivalent to shifting the digits left. The scaling facilitates conversion of the signed packed decimal number to a hexadecimal floating point number by, e.g., isolating certain digits of a number to indicate a selected location in the number to truncate or round, as examples.

The scaled result, which is in one format (e.g., a decimal format), is then converted to a converted result, which is in another format (e.g., a hexadecimal floating point format) (316 of FIG. 3). The conversion may be performed using a number of techniques. In one example, to convert a decimal number to a hexadecimal number:

The decimal number is divided by 16 into a quotient and a remainder;

The remainder times 16 is a digit of the hexadecimal number, starting with the rightmost digit;

The quotient is divided by 16 to provide another quotient and remainder; and

The process repeats starting at the remainder times 16 until the quotient is 0.

Although the above technique may be used to convert a decimal number to a hexadecimal number, other techniques may also be used. In one example, hardware logic is used to facilitate the conversion, improving the speed at which the processing may be performed.

Figure 5:
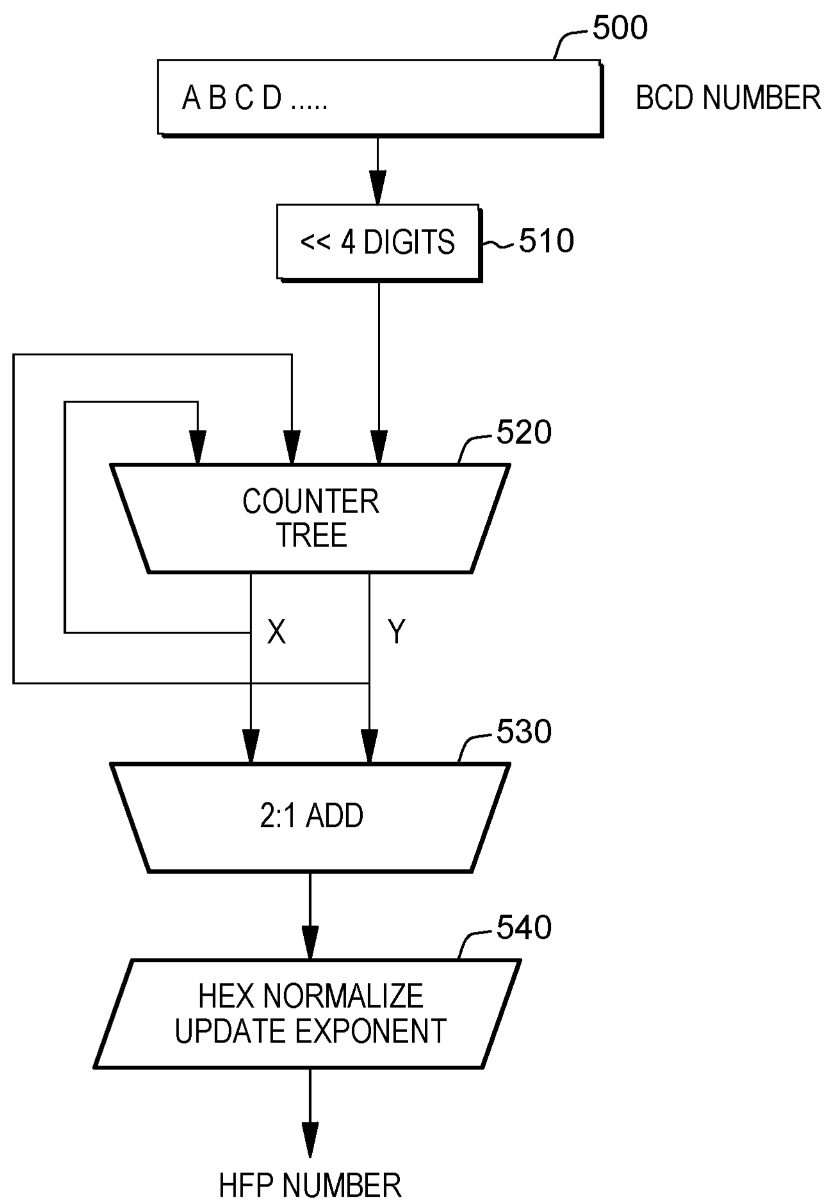
FIG. 5 depicts one example of processing logic to perform a converting operation of the Decimal Scale and Convert to Hexadecimal Floating Point instruction, in accordance with one or more aspects of the present invention.

One example of hardware logic used to perform the converting is described with reference to FIG. 5. Referring to FIG. 5, in one example, a binary coded decimal number 500 is input to the logic. Initially, up to 4 digits of the binary coded decimal number are selected 510, starting at the leftmost digits of the binary coded decimal number. The selected digits are input to a counter tree 520, which uses a redundant format of the digits and an equation to multiply each digit. In one example, the multiplying is performed by shifting the number, in which each power of 2 multiply is a shift of the number.

One example of an equation used by the counter tree is as follows, in which (X'+Y') is initially set to 0 and represents a value resulting from a previous loop in the counter tree, and A, B, C, D are digits of the binary coded decimal (BCD) number.

$$\begin{aligned}\text{New Sum} = X + Y &= (X' + Y') * 10000 + A * 1000 + B * 100 + C * 10 + D \\ &= (X' + Y') * (2^{13} + 2^{11} - 2^{8} + 2^{4}) + \\ &\quad A * (2^{9} + 2^{8} + 2^{7} + 2^{6} + 2^{5} + 2^{3}) + \\ &\quad B * (2^{6} + 2^{5} + 2^{2}) + \\ &\quad C * (2^{3} + 2^{1}) + \\ &\quad D.\end{aligned}$$

The processing loops in the counter tree until all of the digits of the BCD number have been processed. Output of counter tree 520 is input to a 2:1 adder 530, which provides an intermediate converted result (e.g., intermediate hexadecimal floating point number) in a non-redundant format. The output of adder 530 is input to hex normalize, update exponent logic 540, which is used to normalize the output of the adder and update the exponent to provide a hexadecimal floating point number. For instance, the normalization shifts to the left any leading zero digits which are to the right of the radix point to remove those digits and decreases the exponent by one for each shift.

One particular example of the above processing for an 8 digit BCD number is described herein. In the following example, since the actual values of X and Y are implementation specific (e.g., X and Y may be different values but still have the same sum), Z is used which is independent of the implementation. Thus, Z=X+Y; Z'=X'+Y'; and Z' is initialized to 0. Further, in this example, BCD=32610423, and therefore, initially, A=3; B=2; C=6; D=1.

| Formula | Hexadecimal Value |
|---|---|
| $Z = 0 * (2^{13} + 2^{11} - 2^{8} + 2^{4})$ | Z = x0 |
| $+3 * (2^{9} + 2^{8} + 2^{7} + 2^{6} + 2^{5} + 2^{3})$ | +xBB8 |
| $+2 * (2^{6} + 2^{5} + 2^{2})$ | +xC8 |
| $+6 * (2^{3} + 2^{1})$ | +x3C |
| +1 | +x1 |
| Z = 0 + 3000 + 200 + 60 + 1 = 3261 | Z = xCBD |
| Next, A = 0; B = 4; C = 2; D = 3 | |
| $Z = 3261 * (2^{13} + 2^{11} - 2^{8} + 2^{4})$ | Z = 1F196D0 |
| $+0 * (2^{9} + 2^{8} + 2^{7} + 2^{6} + 2^{5} + 2^{3})$ | +x0 |
| $+4 * (2^{6} + 2^{5} + 2^{2})$ | +x190 |
| $+2 * (2^{3} + 2^{1})$ | +x14 |
| +3 | +x3 |
| Z = 32610000 + 400 + 20 + 3 = 32610423 | Z = x1F19877 |

Figure 6:
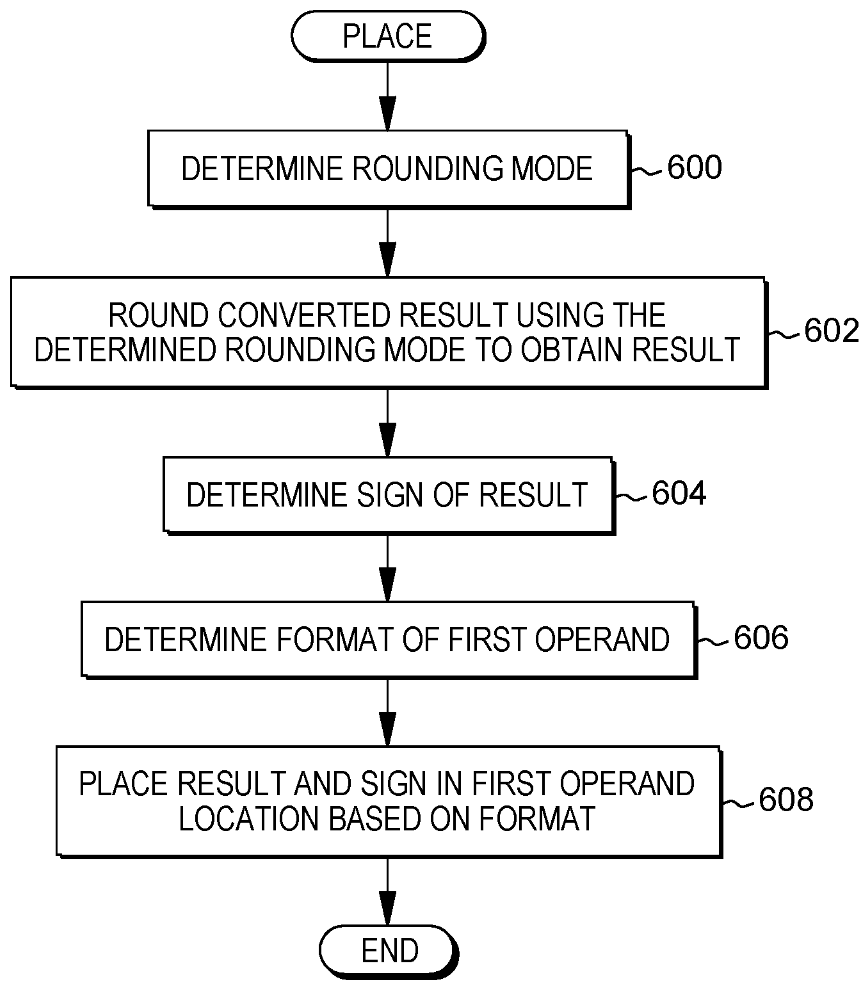
FIG. 6 depicts one example of processing associated with a placing operation of the Decimal Scale and Convert to Hexadecimal Floating Point instruction, in accordance with one or more aspects of the present invention.

The hexadecimal floating point number (also referred to herein as the converted result) is used in obtaining a result, which is placed in the first operand location, such as a register specified using $V_1$ (320 of FIG. 3), as described with reference to FIG. 6. In one embodiment, a selected rounding mode is determined (600). For instance, the rounding mode indicator specified in $M_5$ is obtained and used to determine the rounding mode. The converted result (e.g., a version of the converted result) is then rounded based on the specified rounding mode to obtain a result (602). For instance, when the control (e.g., bit) is, e.g., zero, a normalized result obtained from the converted result is truncated to form the result. When the control is, e.g., one, the normalized result is rounded to nearest with ties away from zero. A normalized result includes, for instance, the 29, 15 or 7 most significant hexadecimal digits of the scaled and converted result for extended, long and short format, respectively, which includes, in one example, one guard digit on the right. A one is added to the leftmost bit of the guard digit of the normalized result, any carry is propagated to the left, and the guard digit is dropped to produce the result fraction.

A sign of the result is also determined, in one example (604). For instance, the sign of the result is equal to the sign code of the second operand except when the second operand is zero, and then the result is forced to be a positive true zero. A true zero is a hexadecimal floating point number with a zero characteristic and a zero fraction.

Further, in one example, a format of the first operand is determined (606). For instance, a value stored in the $M_4$ field is obtained to determine the selected format. The result (e.g., the scaled, converted, normalized and rounded hexadecimal floating point result) and the sign are placed in the selected location (e.g., register specified using $V_1$) based on the selected format (608). For instance, the result and sign are placed in the entire vector register specified by the first operand, for each of the formats, placing the result starting in, e.g., the zero-indexed element in the vector and placing, e.g., zeros in any other elements.

Although various fields and registers of the Decimal Scale and Convert to Hexadecimal Floating Point instruction are described, one or more aspects of the present invention may use other, additional and/or fewer fields and/or registers, and/or other sizes of fields and/or registers, etc. Many variations are possible. For instance, implied registers may be used instead of explicitly specified registers and/or fields of the instruction and/or explicitly specified registers and/or fields may be used instead of implied registers and/or fields. Other variations are also possible.

As described herein, in one aspect, a single instruction (e.g., a single architected machine instruction at the hardware/software interface, e.g., a Decimal Scale and Convert to Hexadecimal Floating Point instruction) is provided to perform a scaling of a decimal number to provide a scaled decimal number and converting the scaled decimal number to a hexadecimal floating point number. Further, in one embodiment, this single instruction is also able to round the converted result (e.g., a version of the converted result, such as a normalized converted result) based on a selected rounding mode and/or is able to format the result based on a selected format of a plurality of possible formats. This instruction is, for instance, a hardware instruction defined in an instruction set architecture (ISA) that directly converts a value in one format, e.g., a decimal number, to a value in another format, e.g., a hexadecimal floating point number. The conversion is direct from, e.g., a decimal number to a hexadecimal floating point number, rather than from, e.g., decimal to integer and integer to hexadecimal floating point. Processing is faster and more efficient than a program performing, for instance, a binary coded decimal multiply or shift, converting binary coded decimal to integer, and converting integer to hexadecimal floating point. The complexity of a program related to performing scale and convert operations is reduced. Further, performance of the operations, and thus, the processor, is improved. The hardware instruction execution reduces execution times and improves performance.

By using a single instruction to perform, e.g., the scaling and converting (and, optionally, rounding; and/or other operations), rather than multiple instructions, performance is improved by not requiring multiple passes through the hardware/software interface. Further, by performing the processing as part of one instruction, the processing remains in the processing unit performing the operations (e.g., a floating point processing unit), not requiring prior to completing the processing, updating of the registers of a register file of the processor (i.e., an array of processor registers used to store data between memory and the functional units, e.g., a floating point processing unit). This improves execution time and reduces use of processor resources.

In a further aspect, a hexadecimal floating point value is converted to a decimal value (e.g., a binary coded decimal value). To provide the conversion, in one example, a single architected machine instruction, referred to herein as a Vector Convert Hexadecimal Floating Point to Scaled Decimal instruction, is used. This single instruction performs, as part of executing the one instruction, at least, converting a value from one format (e.g., hexadecimal floating point) to a converted result in another format (e.g., decimal, such as binary coded decimal), and scaling the converted result to provide a scaled result (e.g., a scaled decimal value).

One embodiment of a Vector Convert Hexadecimal Floating Point to Scaled Decimal instruction used to perform, at least, convert and scale operations is described with reference to FIG. 7. The instruction is executed, in one example, using a general-purpose processor (e.g., processor 104). In the description herein, specific locations, specific fields and/or specific sizes of the fields are indicated (e.g., specific bytes and/or bits). However, other locations, fields and/or sizes may be provided. Further, although the setting of a bit to a particular value, e.g., one or zero, may be specified, this is only an example. The bit may be set to a different value, such as the opposite value or to another value, in other examples. Many variations are possible.

In one example, the Vector Convert Hexadecimal Floating Point to Scaled Decimal instruction has a VRR-j format that denotes a vector register and register operation with an extended operation code (opcode). The instruction is, for instance, part of the vector facility, as described herein.

Figure 7:
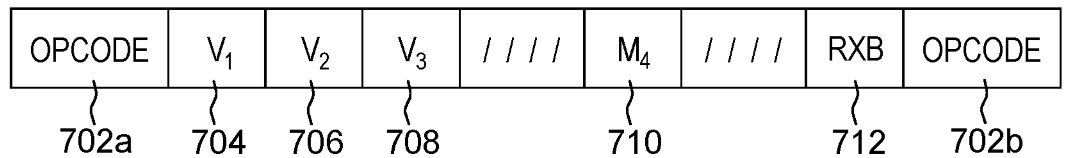
FIG. 7 depicts one example of a format of a Vector Convert Hexadecimal Floating Point to Scaled Decimal instruction, in accordance with one or more aspects of the present invention.

As shown in FIG. 7, in one example, a Vector Convert Hexadecimal Floating Point to Scaled Decimal instruction 700 has a plurality of fields, and a field may have a subscript number associated therewith. The subscript number associated with a field of the instruction denotes the operand to which the field applies. For instance, the subscript number 1 associated with vector register $V_1$ denotes that the register specified using $V_1$ includes the first operand, and so forth. A register operand is one register in length, which is, for instance, 128 bits.

In one embodiment, Vector Convert Hexadecimal Floating Point to Scaled Decimal instruction 700 includes operation code (opcode) fields 702*a*, 702*b* (e.g., bits 0-7 and 40-47) indicating convert and scale operations in which the input data is, e.g., a hexadecimal floating point number and the output is, e.g., a decimal (e.g., binary coded decimal) number; a first vector register ($V_1$) field 704 (e.g., bits 8-11) used to designate a first vector register; a second vector register ($V_2$) field 706 (e.g., bits 12-15) used to designate a second vector register; a third vector register ($V_3$) field 708 (e.g., bits 16-19) used to designate a third vector register; a mask ($M_4$) field 710 (e.g., bits 24-27); and a register extension bit (RXB) field 712 (e.g., bits 36-39), each of which is described below. In one embodiment, the fields are separate and independent from one another; however, in other embodiments, more than one field may be combined. Further information regarding these fields is described below.

In one embodiment, vector register ($V_1$) field 704 is used to indicate a vector register that is to store the first operand. The first operand is a result of converting a hexadecimal floating point value to a decimal value, scaling the decimal value to provide a scaled result, and using the scaled result to obtain the result. The second operand is contained in the vector register specified using vector register ($V_2$) field 706 and is, for instance, an extended precision hexadecimal floating point number. The extended precision hexadecimal floating point number is converted to a binary coded decimal number that is scaled using an unsigned integer included in the third operand, which is contained in the vector register specified using vector register ($V_3$) field 708. In one example, each of vector register fields 704, 706, 708 is used with RXB field 712 to designate the vector register, as described herein.

In one example, a rounding mode is specified using $M_4$ field 710. The converted and scaled result is rounded by the rounding technique, as specified by a rounding mode modifier in the $M_4$field, which is, for instance, in bit 3 of the four-bit $M_4$ field. When the control (e.g., bit) is, e.g., zero, the scaled result is truncated to form the result. When the bit is, e.g., one, the scaled result is rounded to nearest with ties away from zero.

In execution of one embodiment of the Vector Convert Hexadecimal Floating Point to Scaled Decimal instruction, the second operand (e.g., an extended precision hexadecimal floating point number) is converted to a converted result (e.g., a binary coded decimal number), and the converted result is scaled to provide a scaled result, which is, for instance, rounded to obtain a result (e.g., a decimal integer).

Further details of one embodiment of processing based on execution of a Vector Convert Hexadecimal Floating Point to Scaled Decimal instruction, in accordance with one or more aspects of the present invention, are described with reference to FIGS. 8-10. In one example, a processor, such as a general processor 104, is used to execute the instruction. As an example, hardware of the processor is used to execute the instruction. The hardware may be within the processor or coupled thereto for purposes of receiving the instruction from the processor, which, e.g., obtains, decodes and sets-up the instruction to execute on the hardware. Other variations are possible.

Figure 8:
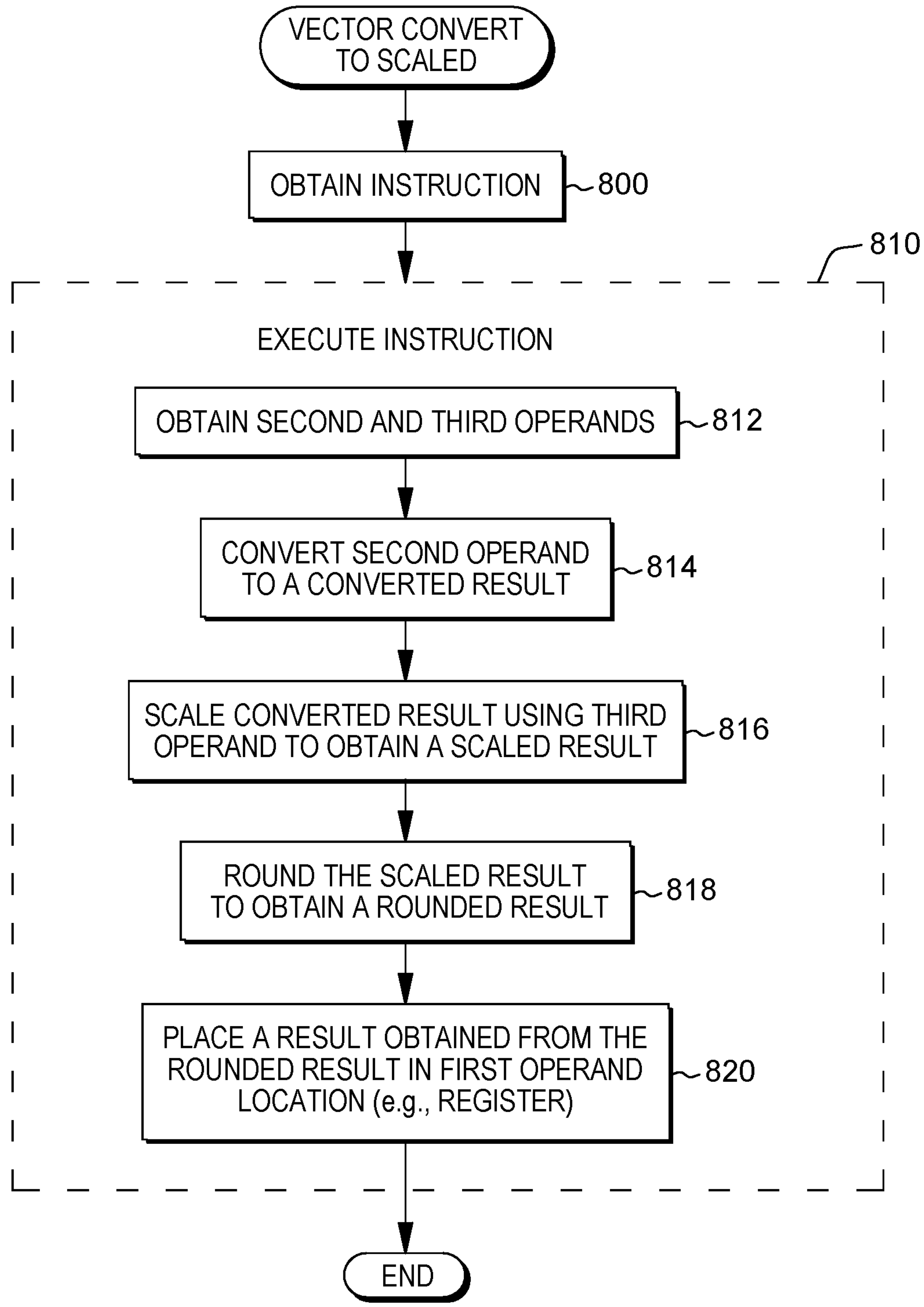
FIG. 8 depicts one example of processing associated with execution of a Vector Convert Hexadecimal Floating Point to Scaled Decimal instruction, in accordance with one or more aspects of the present invention.

Referring to FIG. 8, initially, an instruction, such as a Vector Convert Hexadecimal Floating Point to Scaled Decimal instruction, is obtained (e.g., fetched, received, provided, etc.) 800 and executed 810. The executing includes, for instance, obtaining the second and third operands of the instruction 812. The second operand is, for instance, an extended precision hexadecimal floating point number obtained from a location (e.g., a vector register) specified by the instruction (e.g., using $V_2$ field 706), and the third operand includes, for instance, an unsigned integer obtained from a location (e.g., a vector register) specified by the instruction (e.g., using $V_3$ field 708). In one example, the unsigned integer is located in byte element seven of the third operand.

The second operand, which is in one format (e.g., the extended precision hexadecimal floating point number obtained using $V_2$), is converted to another format (e.g., a binary coded decimal number), which is referred to herein as a converted result 814. The converted result is scaled using the unsigned integer in, e.g., byte element seven of the third operand (obtained using, e.g., $V_3$) to obtain a scaled result 816. The scaled result is rounded, based on the rounding mode specified in $M_4$ field 710, to obtain a rounded result (e.g., a decimal integer) 818. A result, obtained from the rounded result, is placed at the first operand location (e.g., in the vector register specified using $V_1$) 820. Further details regarding the converting, scaling and placing are described below.

As indicated, the second operand, which is in one format (e.g., the extended precision hexadecimal floating point number obtained using $V_2$), is converted to another format (e.g., a binary coded decimal number), which is referred to as a converted result (814 of FIG. 8). The conversion may be performed using a number of techniques. In one example, the conversion includes converting a hexadecimal number to a decimal number. To perform such a conversion, in one example, the decimal equivalent of each digit of the hexadecimal number is multiplied by 16 raised to a power, in which the power starts at 0 for the rightmost hexadecimal digit and increases by one for each next digit. For instance, to convert hex ABC to decimal, C=12 is multiplied by $16^0$ (12×1=12); B=11 is multiplied by $16^1$ (11×16=176); and A=10 is multiplied by $16^2$ (10×256=2560). Then, the results of each multiplication are added together, such as 12+176+2560=2748. Thus, hexadecimal ABC is equal to 2748 in decimal.

Further, if there is a fractional part, then the fractional part is converted to decimal, as follows, in one example: The decimal equivalent of each digit of the fractional hexadecimal number is multiplied by 16 raised to a negative power, in which the power starts at −1 for the leftmost hexadecimal digit after the period and increased by one for each next digit. For instance, to convert hex .DEF to decimal, D=13 is multiplied by $16^{-1}$ (13×0.0625=0.8125); E=14 is multiplied by $16^{-2}$ (14×0.00390625=0.0546875); and F=15 is multiplied by $16^{-3}$ (15×0.0000244140625=0.87084960937). Then, the results of each multiplication are added together, such as 0.8125+0.0546875+0.87084960937=0.87084960937. Thus, hexadecimal .DEF is equal to 0.87084960937 in decimal.

The integer value (e.g., 2748) is combined, in one example, with the fractional value (0.87084960937) to provide a result of 274887084960937, which is the decimal equivalent of xABC.DEF.

Although the above technique may be used to convert a hexadecimal number to a decimal number, other techniques may also be used. In one example, hardware logic is used to facilitate the conversion, improving the speed at which the processing may be performed.

One example of hardware logic used to perform the converting is described with reference to FIG. 9. To facilitate understanding of the hardware logic, a particular example is shown. However, this is only one example and not meant to be limiting in any way.

Figure 9:
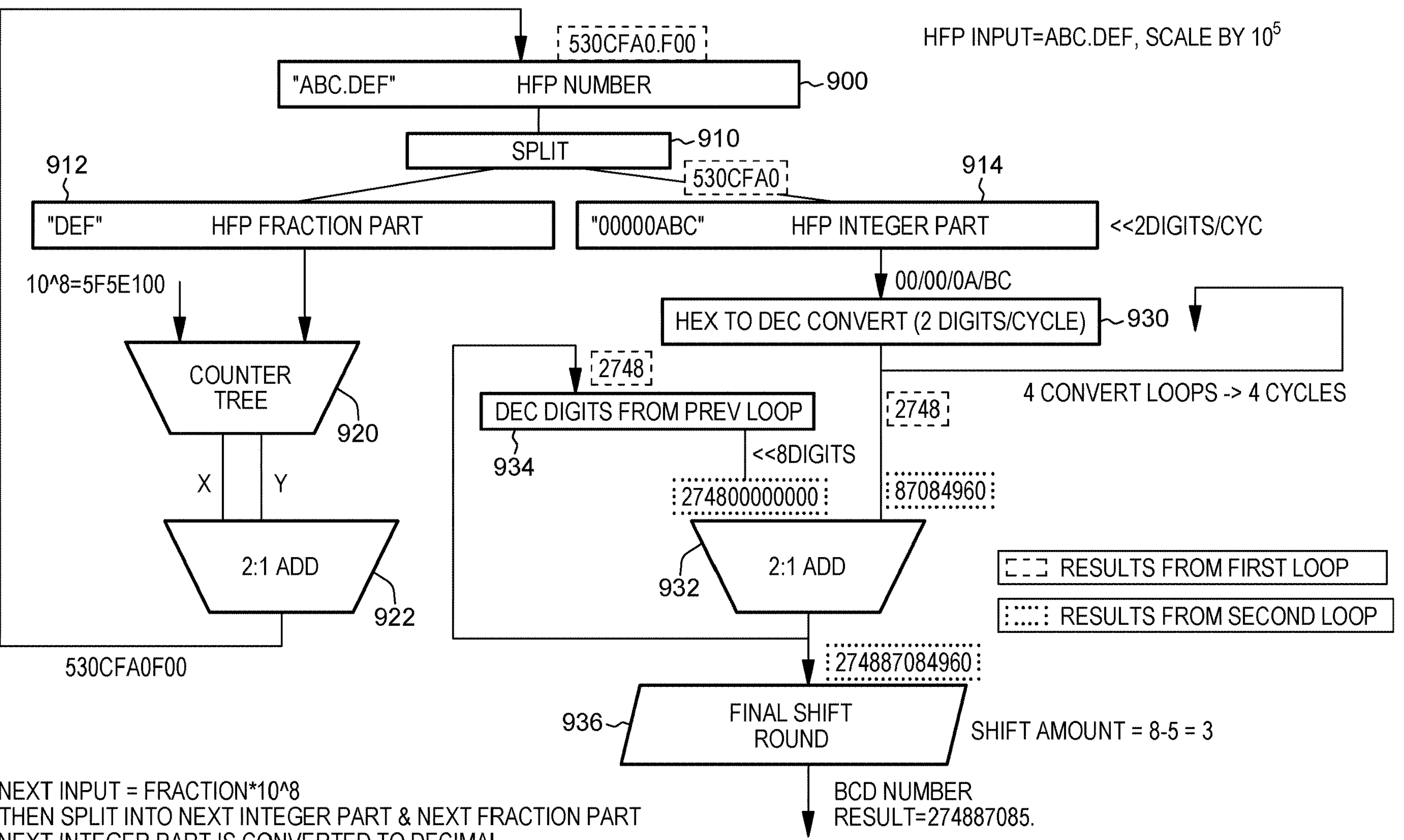
FIG. 9 depicts one example of processing logic to perform a converting operation of the Vector Convert Hexadecimal Floating Point to Scaled Decimal instruction, in accordance with one or more aspects of the present invention.
Figure 10:
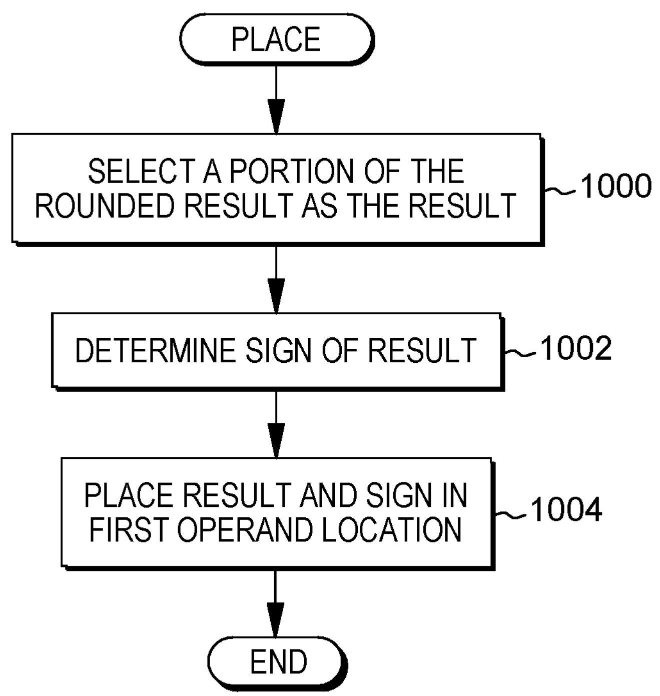
FIG. 10 depicts one example of processing associated with a placing operation of the Vector Convert Hexadecimal Floating Point to Scaled Decimal instruction, in accordance with one or more aspects of the present invention

Referring to FIG. 9, in one example, a hexadecimal floating point number (HFP) 900 is input to the logic. As a particular example, the input hexadecimal floating point number is ABC.DEF. Initially, the hexadecimal floating point number is split 910 into a hexadecimal floating point fraction part 912 (e.g., DEF) and a hexadecimal floating point integer part (e.g., ABC) 914. The fractional part 912 and a selected value (e.g., decimal $10^8$=x5F5E100) are input to a counter tree 920. The counter tree multiplies x5F5E100 by a redundant format of the fractional digits of the fractional part to provide a result. The output of counter tree 920 is input to a 2:1 adder 922 to provide a non-redundant product having an integer portion and a fractional portion. For instance, the output of adder 922 is 530CFA0F00, which is input to split logic 910, which splits the value into an integer portion 530CFA0 and a fractional portion F00 and the process repeats.

An integer portion 914 (e.g., ABC) with a shift amount of five (e.g., 00000ABC) is input to a hexadecimal to decimal conversion logic 930. In one example, two hexadecimal digits per cycle are converted to binary coded decimal starting with the most significant digit, in which it takes four loops to convert eight hexadecimal digits. For instance, for the integer portion, S=0; H(i, i+1)=>A; prior accumulated sum goes through eight binary coded decimal doublers (2×) to multiply by, e.g., 256. Then, the converted hex is summed to old sum*256 (S'=S*256+A; i=i+2). It takes four loops to convert eight hexadecimal digits.

As shown, the output of hexadecimal to decimal conversion logic 930 is input to adder 932 (e.g., a 2:1 adder), as well as up to eight decimal digits from a previous loop 934. The output of adder 932, after a second loop, for the particular example given, is 2748.87084960. The final output of the adder is input to a final shift round logic 936. In one example, there are a scaling by $10^5$ and a round function. Therefore, ABC.DEF in hexadecimal is converted to a binary coded decimal number of 274887085. (2748.87084960 scale by $10^5$ and rounded=274887085.).

To summarize, for a six digit hexadecimal number, such as ABC.DEF and a shift amount of 5, the logic performs, as follows:

ABC is converted to BCD=>2748
DEF is multiplied by $10^8$=5F5E100=>530CFA0.F00
530CFA0 is converted to BCD=>87084960
2748*$10^8$+87084960=274887084960

In one example, when multiply by $10^8$, the original radix point is to be retained, so multiply by $10^{-8}$ to offset the multiply by $10^8$.

2748.87084960 and scale by $10^5$ and round=274887085.

In one example, after converting the hexadecimal number to a binary coded decimal number, the converted result is scaled (816 of FIG. 8). For instance, as described with reference to FIG. 4, a value, referred to as a scale value, of a selected portion (e.g., byte element seven) of the third operand (stored in a vector register designated using V3) is obtained (400). A determination is made as to whether the value is valid (410). For instance, a determination is made as to whether the value has a predetermined relationship with a preselected value, e.g., is the value less than a preselected value, such as 32, as an example? If the value is invalid, the processing ends, e.g., with an error. However, if the value is valid, processing continues with using the value to determine a scale factor (415). For instance, the scale factor is equal to 10 to the power of the value. The converted result is multiplied by the scale factor to obtain a scaled result. In one example, the scaling by a power of 10 is equivalent to a shift operation. The scaling facilitates conversion of the extended precision hexadecimal floating point number by, e.g., allowing more digits to be converted if the result is fractional.

In one example, the converted and scaled value is rounded to obtain a rounded result (818 of FIG. 8). For instance, the scaled result is rounded by the rounding technique, as specified by a rounding mode modifier in the $M_4$ field, which is, for instance, in bit 3 of the four-bit $M_4$ field 710. When the control (e.g., bit) is, e.g., zero, the scaled result is truncated to form the result. When the control is, e.g., one, the scaled result is rounded to nearest with ties away from zero. A result is obtained from the rounded result. For instance, a selected portion of the rounded result is selected as the result (e.g., a decimal number, such as a 32-digit signed packed decimal number), which is placed in the first operand location (820 of FIG. 8).

Further details regarding one embodiment of the placing are described with reference to FIG. 10. In one embodiment, a portion of the rounded result (e.g., rightmost 31 digits of the decimal integer, ignoring any overflow) is selected as the decimal integer result (1000). Further, in one example, a sign of the result is determined (1002). For instance, the sign of the result is equal to the sign of the second operand even when the second operand is negative zero. The result and the sign are placed in the first operand location (1004).

Although various fields and registers of the Vector Convert Hexadecimal Floating Point to Scaled Decimal instruction are described, one or more aspects of the present invention may use other, additional and/or fewer fields and/or registers, and/or other sizes of fields and/or registers, etc. Many variations are possible. For instance, implied registers may be used instead of explicitly specified registers and/or fields of the instruction and/or explicitly specified registers and/or fields may be used instead of implied registers and/or fields. Other variations are also possible.

As described herein, in one aspect, a single instruction (e.g., a single architected machine instruction at the hardware/software interface, e.g., a Vector Convert Hexadecimal Floating Point to Scaled Decimal instruction) is provided to perform converting of a hexadecimal floating point number to a decimal number and scaling the decimal number to provide a scaled decimal number. Further, in one embodiment, this single instruction is also able to round the converted and scaled result based on a selected rounding mode. This instruction is, for instance, a hardware instruction defined in an instruction set architecture (ISA) that directly converts a value in one format, e.g., a hexadecimal floating point number, to a value in another format, e.g., a decimal number. The conversion is direct from, e.g., a hexadecimal floating point number, to a decimal number, rather than from, e.g., hexadecimal floating point number to integer and integer to decimal, as performed by programs. Thus, processing is faster and more efficient, and the complexity of a program related to performing convert and scale operations is reduced. Further, performance of the operations, and thus, the processor, is improved. The hardware instruction execution reduces execution times and improves performance.

By using a single instruction to perform, e.g., the converting and scaling operations (and, optionally, rounding), rather than multiple instructions, performance is improved by not requiring multiple passes through the hardware/software interface. Further, by performing the processing as part of one instruction, the processing remains in the processing unit performing the operations (e.g., a floating point processing unit), not requiring prior to completing the processing, updating of the registers of a register file of the processor (i.e., an array of processor registers used to store data between memory and the functional units, e.g., a floating point processing unit). This improves execution time and reduces use of processor resources.

One or more aspects of the present invention are inextricably tied to computer technology and facilitate processing within a computer, improving performance thereof. The use of a single architected machine instruction to, at least, perform a scale of a decimal number (e.g., a binary coded decimal number) to obtain a scaled decimal number, to convert the scaled decimal number to a hexadecimal floating point number, and optionally, to perform rounding improves performance within the computing environment by reducing complexity, reducing use of resources and increasing processing speed. Further, the use of a single architected machine instruction to convert a hexadecimal floating point number to a decimal number (e.g., a binary coded decimal number) and to scale the decimal number to obtain a scaled decimal number (and, in one embodiment, round the result and/or perform other operations) improves performance within the computing environment by reducing complexity, reducing use of resources and increasing processing speed. The data and/or instruction(s) may be used in many technical fields, such as in computer processing, medical processing, engineering, automotive technologies, manufacturing, etc. By providing optimizations in converting the data, these technical fields are improved by reducing execution time.

Further details of embodiments of facilitating processing within a computing environment, as it relates to one or more aspects of the present invention, are described with reference to FIGS. 11A-11C.

Referring to FIG. 11A, in one embodiment, an instruction is executed to perform converting and scaling operations (1100). The executing the instruction includes converting an input value from one format to provide a converted result in another format (1102), scaling the converted value to provide a scaled result (1104), and placing a result obtained from the scaled result in a selected location (1106).

By using a single instruction to perform the converting and scaling operations, performance is improved, and utilization of resources is reduced. By using a single architected instruction to perform the converting and scaling operations, certain tasks may be performed, such as the converting and scaling operations, much more efficiently than using a software paradigm. The converting and scaling operations are performed much faster, reducing execution time, and improving processor and/or overall system performance.

In one example, the one format is a hexadecimal floating point format, and the other format is a decimal format (1108). As an example, the decimal format is a binary coded decimal format (1110).

In one example, the scaling includes determining a scale factor (1112) and using the scale factor in scaling the converted result to provide the scaled result (1114). The determining the scale factor includes, for instance, obtaining a scale value using an operand of the instruction (1116) and using the scale value to determine the scale factor (1118). The using the scale factor includes multiplying the converted result by the scale factor to obtain the scaled result (1120).

The scaling isolates, for instance, certain digits of a number to indicate a selected location in the number to truncate or round, as examples.

In one example, referring to FIG. 11B, the executing further includes rounding the scaled result to provide a rounded result (1130). The rounding includes, for instance, obtaining a rounding mode using a field of the instruction (1132) and rounding the scaled result to the rounded result based on the rounding mode (1134).

By using a single instruction to perform, at least, the converting, scaling and rounding operations, performance is improved, and utilization of resources is reduced. By using a single architected instruction to perform the converting, scaling and rounding operations, certain tasks may be performed, such as the converting, scaling and rounding operations, much more efficiently than using a software paradigm. The converting, scaling and rounding operations are performed much faster, reducing execution time, and improving processor and/or overall system performance.

In one example, the placing includes selecting a portion of the rounded result as the result (1136) and placing the result in the selected location (1138). In one example, a sign of the result is determined (1140), and the sign of the result is placed in the selected location (1142). The selected location includes, for instance, a register specified using a field of the instruction (1144).

In another aspect, referring to FIG. 11C, in one embodiment, an instruction is executed to perform scaling and converting operations (1150). The executing the instruction includes, for instance, scaling an input value in one format to provide a scaled result (1152), converting the scaled result from the one format to provide a converted result in another format (1154), and placing a result obtained from the converted result in a selected location (1156).

By using a single instruction to perform, at least, the scaling and converting operations, performance is improved, and utilization of resources is reduced. By using a single architected instruction to perform the scaling and converting operations, certain tasks may be performed, such as the scaling and converting operations, much more efficiently than using a software paradigm. The scaling and converting operations are performed much faster, reducing execution time, and improving processor and/or overall system performance.

In one example, the executing the instruction further includes rounding a version of the converted result to provide a rounded result (1160), and the result is obtained using the rounded result (1162).

By using a single instruction to perform, at least, the scaling, converting and rounding operations, performance is improved, and utilization of resources is reduced. By using a single architected instruction to perform the scaling, converting and rounding operations, certain tasks may be performed, such as the scaling, converting and rounding operations, much more efficiently than using a software paradigm. The scaling, converting and rounding operations are performed much faster, reducing execution time, and improving processor and/or overall system performance.

As an example, the selected location is a register specified using a field of the instruction (1170), and the placing the result in the selected location includes determining a format for the result (1172) and placing the result in the register based on the format (1174).

Other variations and embodiments are possible.

Figure 12A:
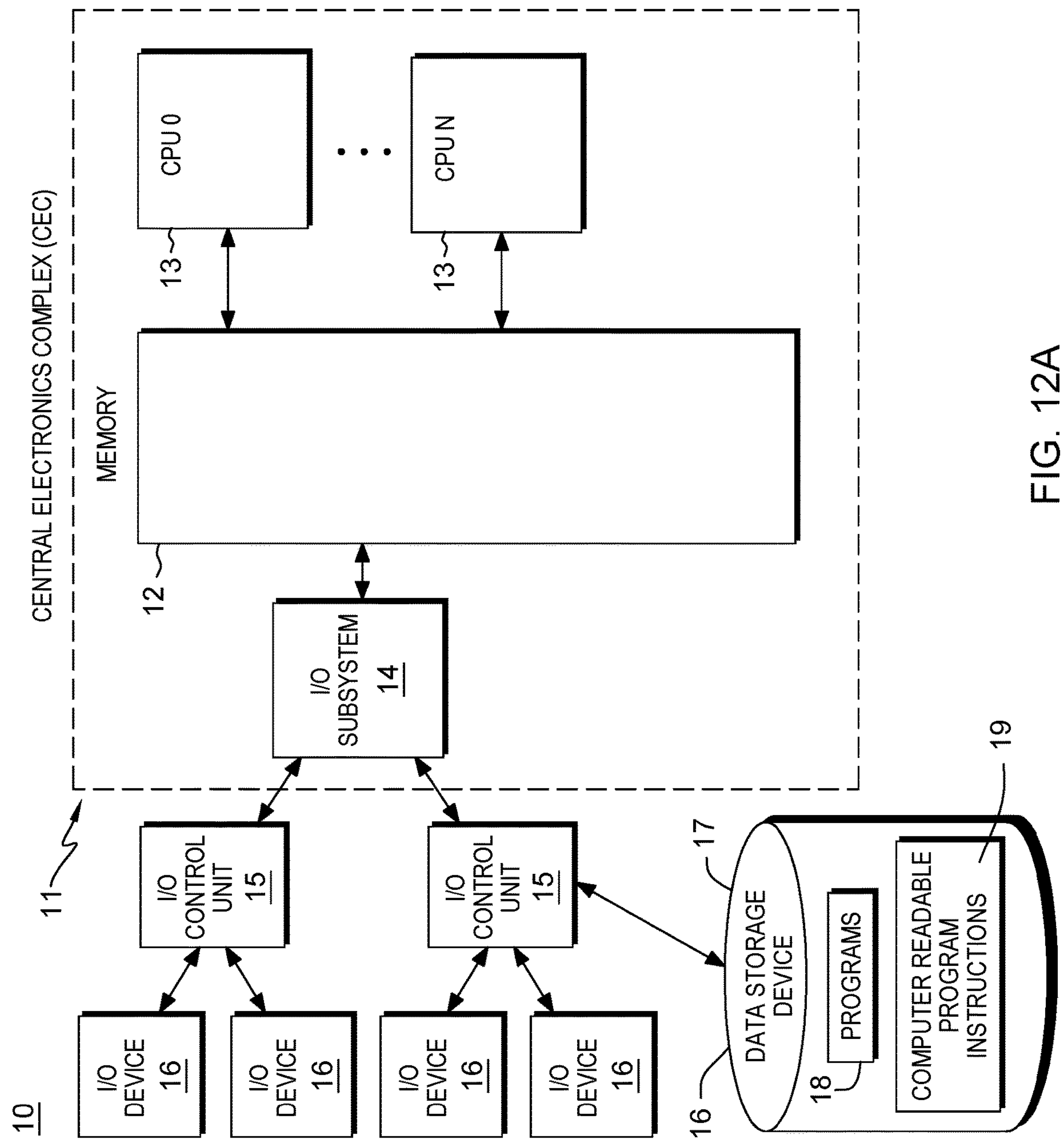
FIG. 12A depicts another example of a computing environment to incorporate and use one or more aspects of the present invention.

Aspects of the present invention may be used by many types of computing environments. Another example of a computing environment to incorporate and use one or more aspects of the present invention is described with reference to FIG. 12A. As an example, the computing environment of FIG. 12A is based on the z/Architecture® hardware architecture offered by International Business Machines Corporation, Armonk, N.Y. The z/Architecture hardware architecture, however, is only one example architecture. Again, the computing environment may be based on other architectures, including, but not limited to, the Intel® x86 architectures, other architectures of International Business Machines Corporation, and/or architectures of other companies. Intel is a trademark or registered trademark of Intel Corporation or its subsidiaries in the United States and other countries.

In one example, a computing environment 10 includes a central electronics complex (CEC) 11. Central electronics complex 11 includes a plurality of components, such as, for instance, a memory 12 (a.k.a., system memory, main memory, main storage, central storage, storage) coupled to one or more processors (a.k.a., central processing units (CPUs)) 13 and to an input/output (I/O) subsystem 14.

I/O subsystem 14 can be a part of the central electronics complex or separate therefrom. It directs the flow of information between main storage 12 and input/output control units 15 and input/output (I/O) devices 16 coupled to the central electronics complex.

Many types of I/O devices may be used. One particular type is a data storage device 17. Data storage device 17 can store one or more programs 18, one or more computer readable program instructions 19, and/or data, etc. The computer readable program instructions can be configured to carry out functions of embodiments of aspects of the invention.

Central electronics complex 11 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 11. Examples include, but are not limited to: microcode, device drivers, redundant processing units, external disk drive arrays, RAID systems, tape drives, and data archival storage systems, etc.

Further, central electronics complex 11 can be operational with numerous other general-purpose or special-purpose computing system environments or configurations. Examples of well-known computing systems, environments, and/or configurations that may be suitable for use with central electronics complex 11 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 12C:
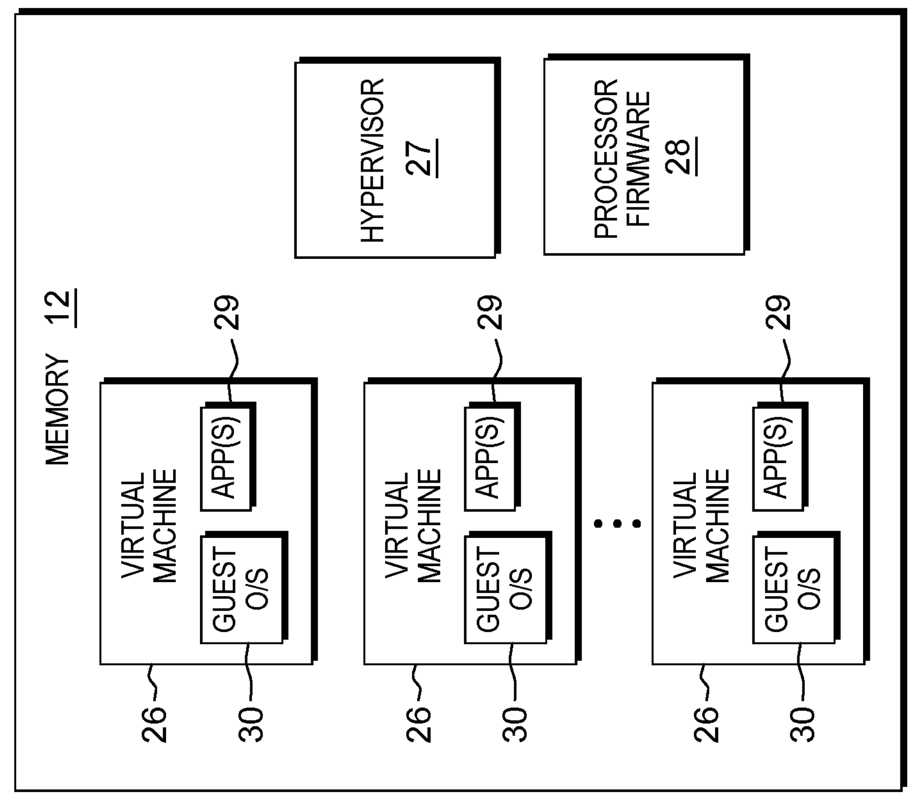
FIG. 12C depicts another example of further details of a memory of FIG. 12A, in accordance with one or more aspects of the present invention.
Figure 12B:
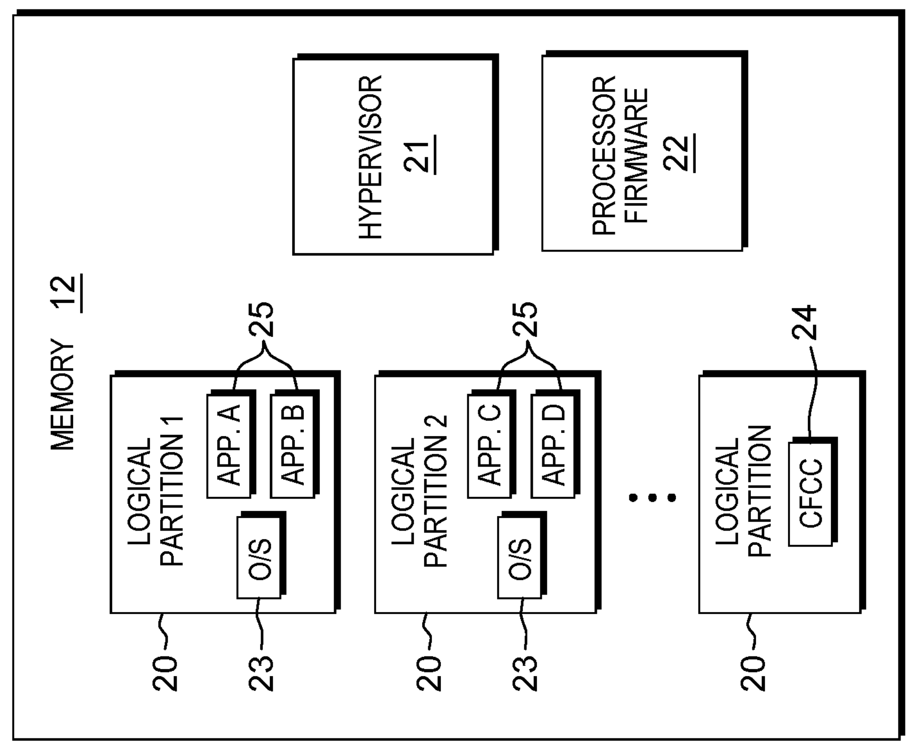
FIG. 12B depicts one example of further details of a memory of FIG. 12A, in accordance with one or more aspects of the present invention.

Central electronics complex 11 provides in one or more embodiments logical partitioning and/or virtualization support. In one embodiment, as shown in FIG. 12B, memory 12 includes, for example, one or more logical partitions 20, a hypervisor 21 that manages the logical partitions, and processor firmware 22. One example of hypervisor 21 is the Processor Resource/System Manager (PR/SM™), offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware. PR/SM is a trademark or registered trademark of International Business Machines Corporation in at least one jurisdiction.

Each logical partition 20 is capable of functioning as a separate system. That is, each logical partition can be independently reset, run a guest operating system 23 such as the z/OS® operating system, offered by International Business Machines Corporation, Armonk, N.Y., or other control code 24, such as coupling facility control code (CFCC), and operate with different programs 25. An operating system or application program running in a logical partition appears to have access to a full and complete system, but in reality, only a portion of it is available. Although the z/OS operating system is offered as an example, other operating systems offered by International Business Machines Corporation and/or other companies may be used in accordance with one or more aspects of the present invention.

Memory 12 is coupled to CPUs 13 (FIG. 12A), which are physical processor resources that can be allocated to the logical partitions. For instance, a logical partition 20 includes one or more logical processors, each of which represents all or a share of a physical processor resource 13 that can be dynamically allocated to the logical partition.

In yet a further embodiment, the central electronics complex provides virtual machine support (either with or without logical partitioning support). As shown in FIG. 12C, memory 12 of central electronics complex 11 includes, for example, one or more virtual machines 26, a virtual machine manager, such as a hypervisor 27, that manages the virtual machines, and processor firmware 28. One example of hypervisor 27 is the z/VM® hypervisor, offered by International Business Machines Corporation, Armonk, N.Y. The hypervisor is sometimes referred to as a host. z/VM is a trademark or registered trademark of International Business Machines Corporation in at least one jurisdiction.

The virtual machine support of the central electronics complex provides the ability to operate large numbers of virtual machines 26, each capable of operating with different programs 29 and running a guest operating system 30, such as the Linux® operating system. Each virtual machine 26 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 13A:
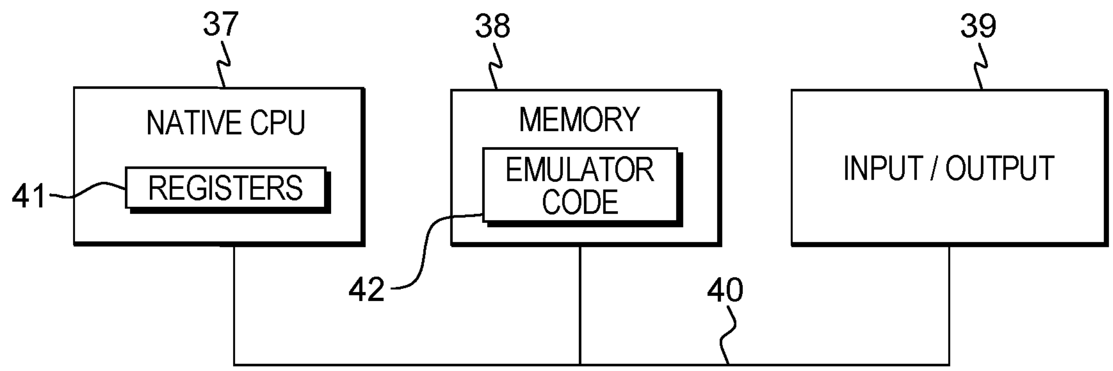
FIG. 13A depicts yet another example of a computing environment to incorporate and use one or more aspects of the present invention.

Another embodiment of a computing environment to incorporate and use one or more aspects of the present invention is described with reference to FIG. 13A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC° processor offered by International Business Machines Corporation, Armonk, N.Y.; an HP Superdome with Intel® Itanium® II processors offered by Hewlett Packard Co., Palo Alto, Calif.; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Itanium is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 13B:
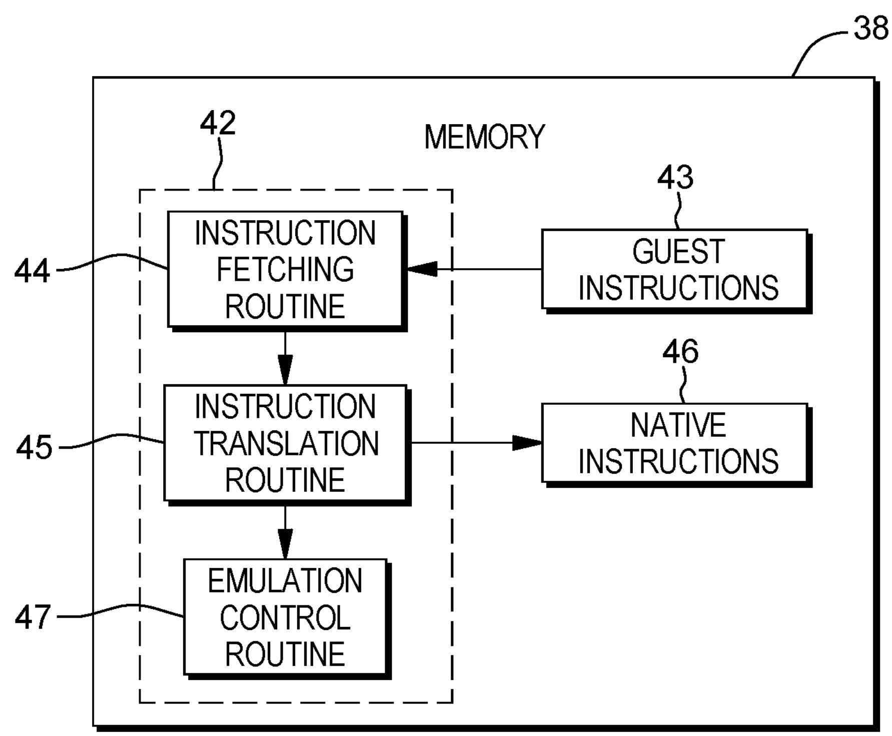
FIG. 13B depicts further details of the memory of FIG. 13A, in accordance with one or more aspects of the present invention.

Further details relating to emulator code 42 are described with reference to FIG. 13B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture hardware architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

Example instructions that may be emulated are the Decimal Scale and Convert To Hexadecimal Floating Point instruction and the Vector Convert Hexadecimal Floating Point To Scaled Decimal instruction described herein, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
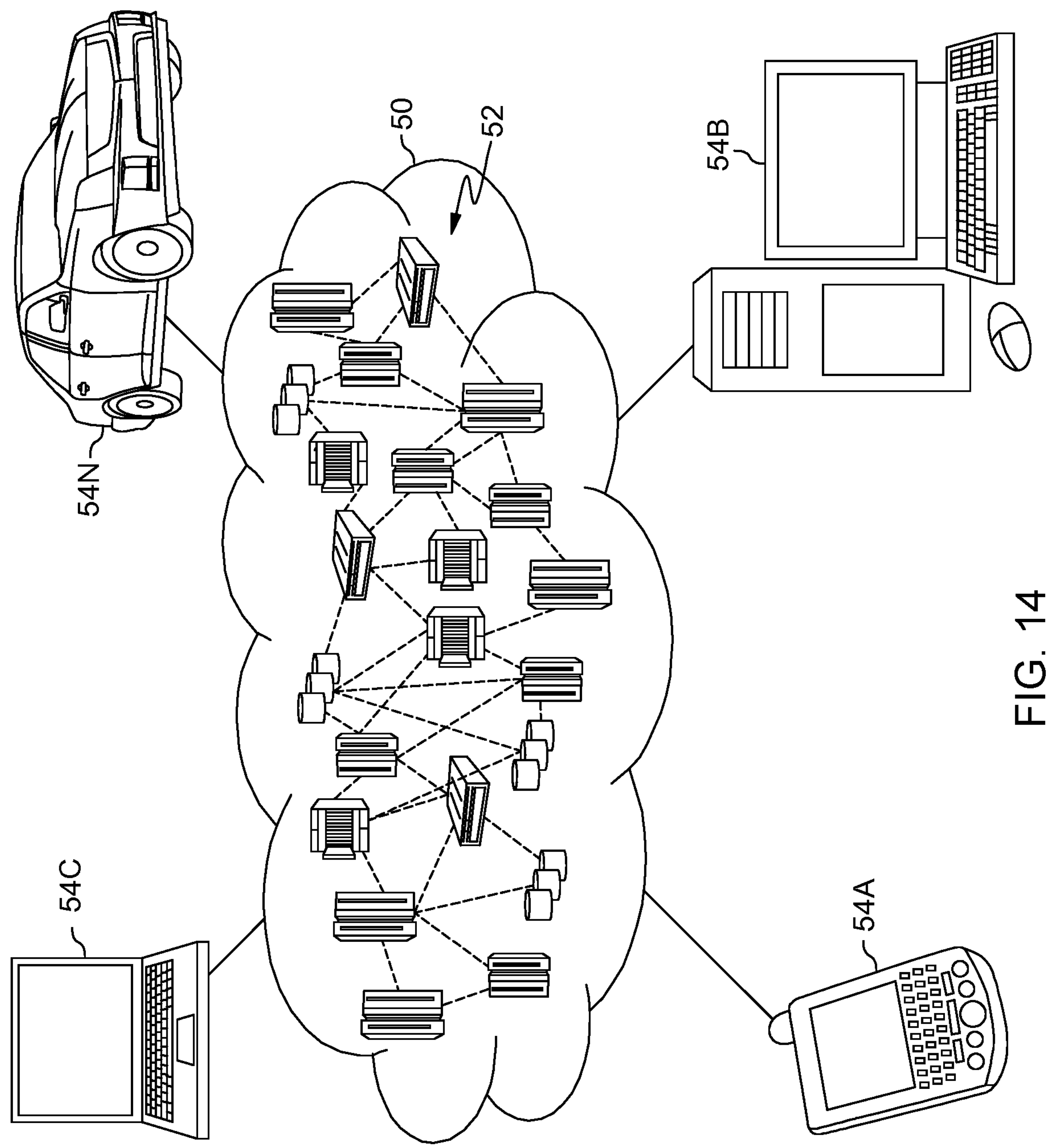
FIG. 14 depicts one embodiment of a cloud computing environment, in accordance with one or more aspects of the present invention.

Referring now to FIG. 14, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 52 and cloud computing environment 50 can communicate with any type of computerized device over any type of network and/or network addressable connection (e.g., using a web browser).

Figure 15:
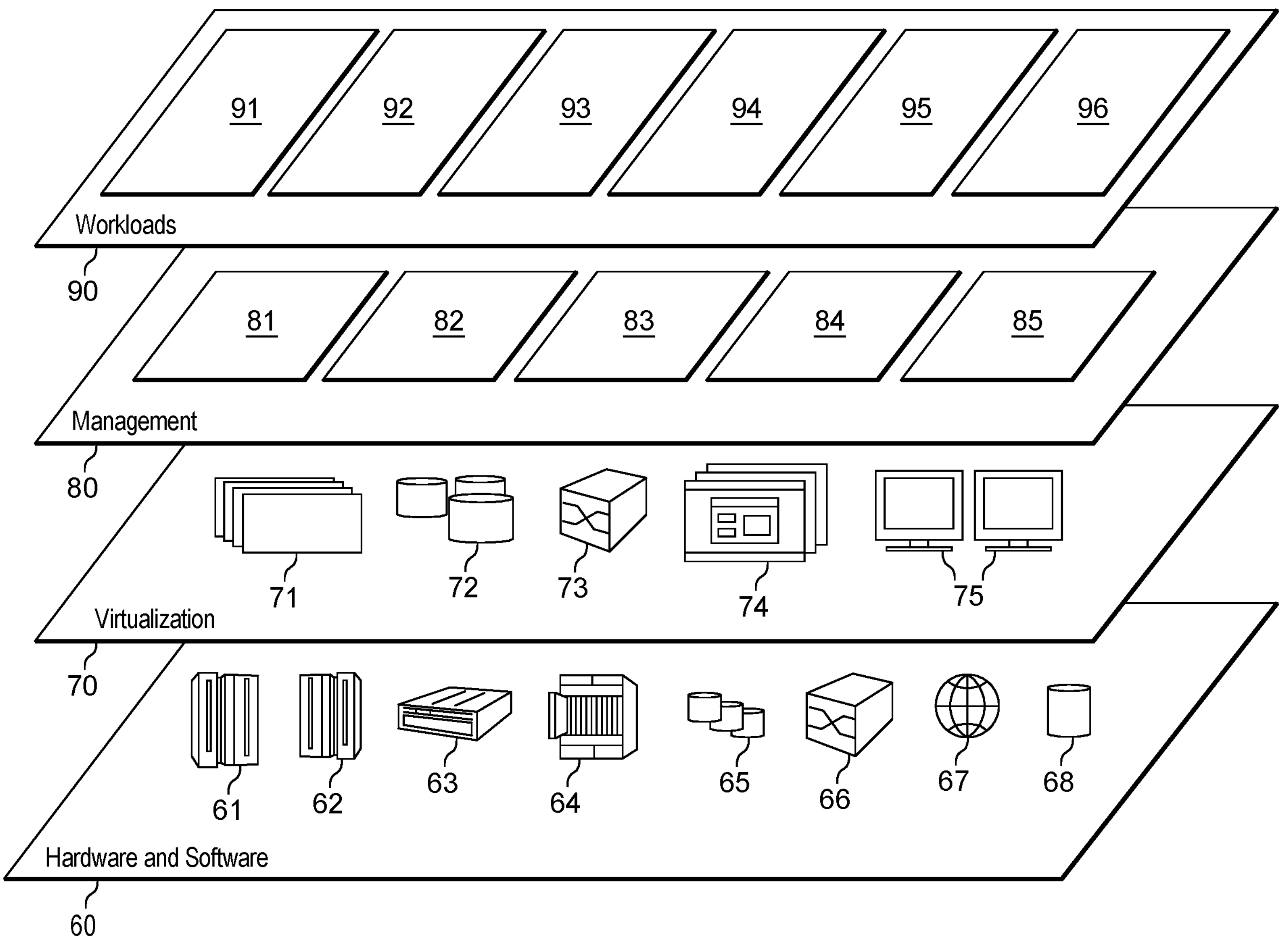
FIG. 15 depicts one example of abstraction model layers, in accordance with one or more aspects of the present invention.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and scale and convert and/or convert and scale (and round processing) 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different register may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:

one or more computer readable storage media and program instructions collectively stored on the one or more computer readable storage media to perform a method comprising:

executing a convert instruction to perform converting and scaling operations, the executing the convert instruction comprising:

converting an input value from one format to provide a converted result in another format;

scaling the converted result to provide a scaled result, wherein the scaling includes, as part of executing the convert instruction:

obtaining, using a field of the convert instruction, a scale value;

determining whether the scale value is valid, wherein the determining is based on a preselected value;

using the scale value to determine a scale factor different from the scale value, based on determining that the scale value is valid; and using the scale factor in scaling the converted result to provide the scaled result; and placing a result obtained from the scaled result in a selected location.

2. The computer program product of claim 1, wherein the one format is a hexadecimal floating point format and the other format is a decimal format.

3. The computer program product of claim 2, wherein the decimal format is a binary coded decimal format.

4. The computer program product of claim 1, wherein the using the scale factor comprises multiplying the converted result by the scale factor to obtain the scaled result.

5. The computer program product of claim 1, wherein the executing the instruction further comprises rounding the scaled result to provide a rounded result.

6. The computer program product of claim 5, wherein the rounding comprises:

obtaining a rounding mode using a field of the instruction; and rounding the scaled result to the rounded result based on the rounding mode.

7. The computer program product of claim 6, wherein the placing comprises:

selecting a portion of the rounded result as the result; and placing the result in the selected location.

8. The computer program product of claim 1, wherein the executing the instruction further comprises:

determining a sign of the result; and placing the sign of the result in the selected location.

9. The computer program product of claim 1, wherein the selected location comprises a register specified using a field of the instruction.

10. A computer system for facilitating processing within a computing environment, the computer system comprising:

a memory; and a processor in communication with the memory, wherein the computer system is configured to perform a method, said method comprising:

executing a convert instruction to perform converting and scaling operations, the executing the convert instruction comprising:

converting an input value from one format to provide a converted result in another format;

scaling the converted result to provide a scaled result, wherein the scaling includes, as part of executing the convert instruction:

obtaining, using a field of the convert instruction, a scale value;

determining whether the scale value is valid, wherein the determining is based on a preselected value;

using the scale value to determine a scale factor different from the scale value, based on determining that the scale value is valid; and using the scale factor in scaling the converted result to provide the scaled result; and placing a result obtained from the scaled result in a selected location.

11. The computer system of claim 10, wherein the using the scale factor comprises multiplying the converted result by the scale factor to obtain the scaled result.

12. The computer system of claim 10, wherein the executing the instruction further comprises rounding the scaled result to provide a rounded result.

13. The computer system of claim 12, wherein the rounding comprises:

obtaining a rounding mode using a field of the instruction; and rounding the scaled result to the rounded result based on the rounding mode.

14. The computer system of claim 13, wherein the placing comprises:

selecting a portion of the rounded result as the result; and placing the result in the selected location.

15. A computer-implemented method of facilitating processing within a computing environment, the computer-implemented method comprising:

executing a convert instruction to perform converting and scaling operations, the executing the convert instruction comprising:

converting an input value from one format to provide a converted result in another format;

scaling the converted result to provide a scaled result, wherein the scaling includes, as part of executing the convert instruction:

obtaining, using a field of the convert instruction, a scale value;

determining whether the scale value is valid, wherein the determining is based on a preselected value;

using the scale value to determine a scale factor different from the scale value, based on determining that the scale value is valid; and using the scale factor in scaling the converted result to provide the scaled result; and placing a result obtained from the scaled result in a selected location.

16. The computer-implemented method of claim 15, wherein the using the scale factor comprises multiplying the converted result by the scale factor to obtain the scaled result.

17. The computer-implemented method of claim 15, wherein the executing the instruction further comprises rounding the scaled result to provide a rounded result.

18. The computer-implemented method of claim 17, wherein the rounding comprises:

obtaining a rounding mode using a field of the instruction; and rounding the scaled result to the rounded result based on the rounding mode.

19. The computer-implemented method of claim 18, wherein the placing comprises:

selecting a portion of the rounded result as the result; and placing the result in the selected location.

20. A computer program product for facilitating processing within a computing environment, the computer program product comprising:

one or more computer readable storage media and program instructions collectively stored on the one or more computer readable storage media to perform a method comprising:

executing a convert instruction to perform scaling and converting operations, the executing the convert instruction comprising:

scaling an input value in one format to provide a scaled result, wherein the scaling includes, as part of executing the convert instruction:

obtaining, using a field of the convert instruction, a scale value;

determining whether the scale value is valid, wherein the determining is based on a preselected value;

using the scale value to determine a scale factor different from the scale value, based on determining that the scale value is valid; and using the scale factor in scaling the input value to provide the scaled result;

converting the scaled result from the one format to provide a converted result in another format; and placing a result obtained from the converted result in a selected location.

21. The computer program product of claim 20, wherein the executing the instruction further comprises rounding a version of the converted result to provide a rounded result, and wherein the result is obtained using the rounded result.

22. The computer program product of claim 21, wherein the selected location is a register specified using a field of the instruction, and wherein the placing the result in the selected location comprises:

determining a format for the result; and placing the result in the register based on the format.

23. The computer system of claim 10, wherein the executing the instruction further comprises:

determining a sign of the result; and placing the sign of the result in the selected location.

24. A computer-implemented method of facilitating processing within a computing environment, the computer-implemented method comprising:

executing a convert instruction to perform scaling and converting operations, the executing the convert instruction comprising:

scaling an input value in one format to provide a scaled result, wherein the scaling includes, as part of executing the convert instruction:

obtaining, using a field of the convert instruction, a scale value;

determining whether the scale value is valid, wherein the determining is based on a preselected value;

using the scale value to determine a scale factor different from the scale value, based on determining that the scale value is valid; and using the scale factor in scaling the input value to provide the scaled result;

converting the scaled result from the one format to provide a converted result in another format; and placing a result obtained from the converted result in a selected location.

25. The computer-implemented method of claim 24, wherein the executing the instruction further comprises rounding a version of the converted result to provide a rounded result, and wherein the result is obtained using the rounded result.

* * * * *